(12) United States Patent
Tomioka et al.

(10) Patent No.: US 6,704,082 B2
(45) Date of Patent: Mar. 9, 2004

(54) LIQUID CRYSTAL DISPLAY DEVICE

(75) Inventors: Yasushi Tomioka, Hitachi (JP); Kenji Okishiro, Hitachi (JP); Yoshiyuki Umeda, Hitachi (JP); Hitoshi Oaku, Hitachi (JP); Katsumi Kondo, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/779,458

(22) Filed: Feb. 9, 2001

(65) Prior Publication Data

US 2001/0048498 A1 Dec. 6, 2001

(30) Foreign Application Priority Data

Mar. 30, 2000 (JP) ........................................ 2000-097820

(51) Int. Cl.[7] ..................... G02F 1/1337; G02F 1/1343
(52) U.S. Cl. .................. 349/123; 349/124; 349/141
(58) Field of Search ................................ 349/123, 141, 349/124; 428/1.26, 1.27, 532

(56) References Cited

U.S. PATENT DOCUMENTS

| | | | | |
|---|---|---|---|---|
| 5,596,435 A | * | 1/1997 | Sunohara et al. | ............ 349/124 |
| 5,700,860 A | * | 12/1997 | Nishikawa et al. | ............ 430/20 |
| 6,078,375 A | * | 6/2000 | Matsumoto et al. | ......... 349/123 |
| 6,091,473 A | * | 7/2000 | Hebiguchi | .................. 349/138 |
| 6,143,380 A | * | 11/2000 | Gibbons et al. | ............. 349/124 |
| 2001/0024258 A1 | * | 9/2001 | Kim et al. | ................... 349/139 |

FOREIGN PATENT DOCUMENTS

JP           11-30779    * 2/1999

* cited by examiner

*Primary Examiner*—Tarifur R. Chowdhury
(74) *Attorney, Agent, or Firm*—Antonelli, Terry, Stout & Kraus, LLP

(57) ABSTRACT

A liquid crystal display device has a pair of substrates, at least one of the substrates being transparent; a liquid crystal layer interposed between the pair of substrates; and pixel electrodes and common electrodes and active elements arranged on at least one substrate between the pair of substrates, wherein a pair of alignment layers are made of an organic polymer of polyamic acid group of polyamide ester group having a relative imidization ration above 60%; or at least one layer of an insulation film is interposed between the alignment layer in a side of the substrate having the group of electrodes formed thereon, and the pixel electrode and the common electrode disposed under the alignment layer to prevent occurrence of the sticking image and the after image by flattening the electrode portions to moderate the electric field concentration.

27 Claims, 12 Drawing Sheets

FIG. 2
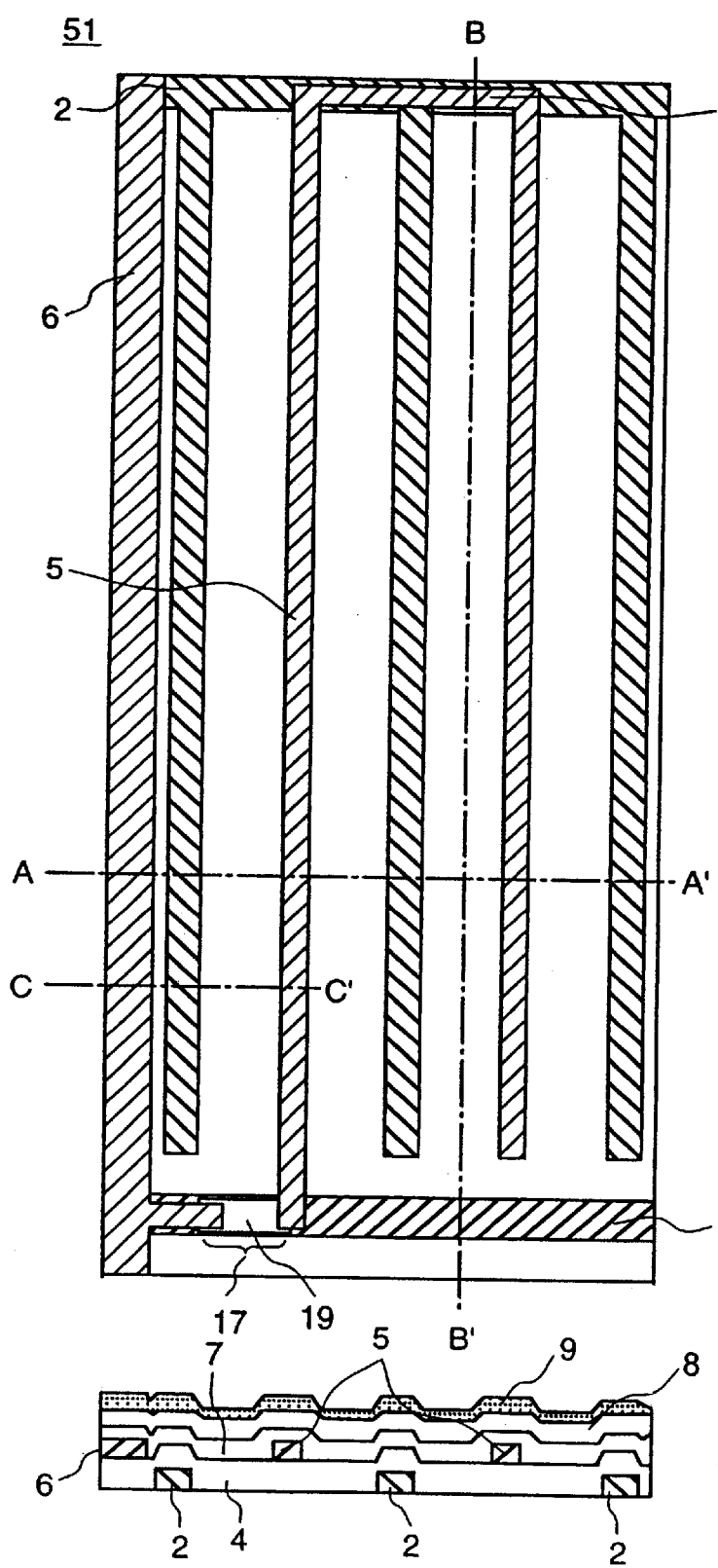
FIG. 2B
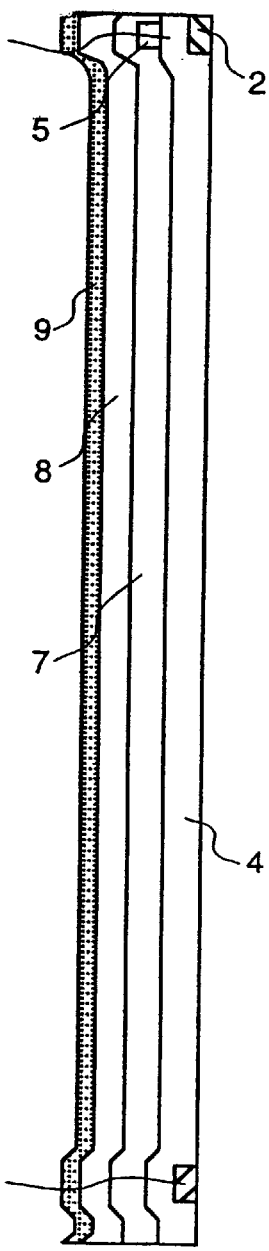
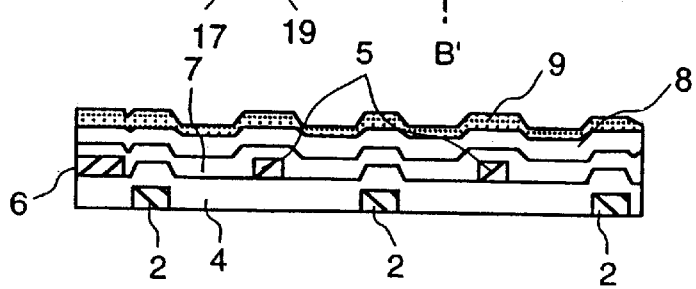
FIG. 2A

FIG. 4
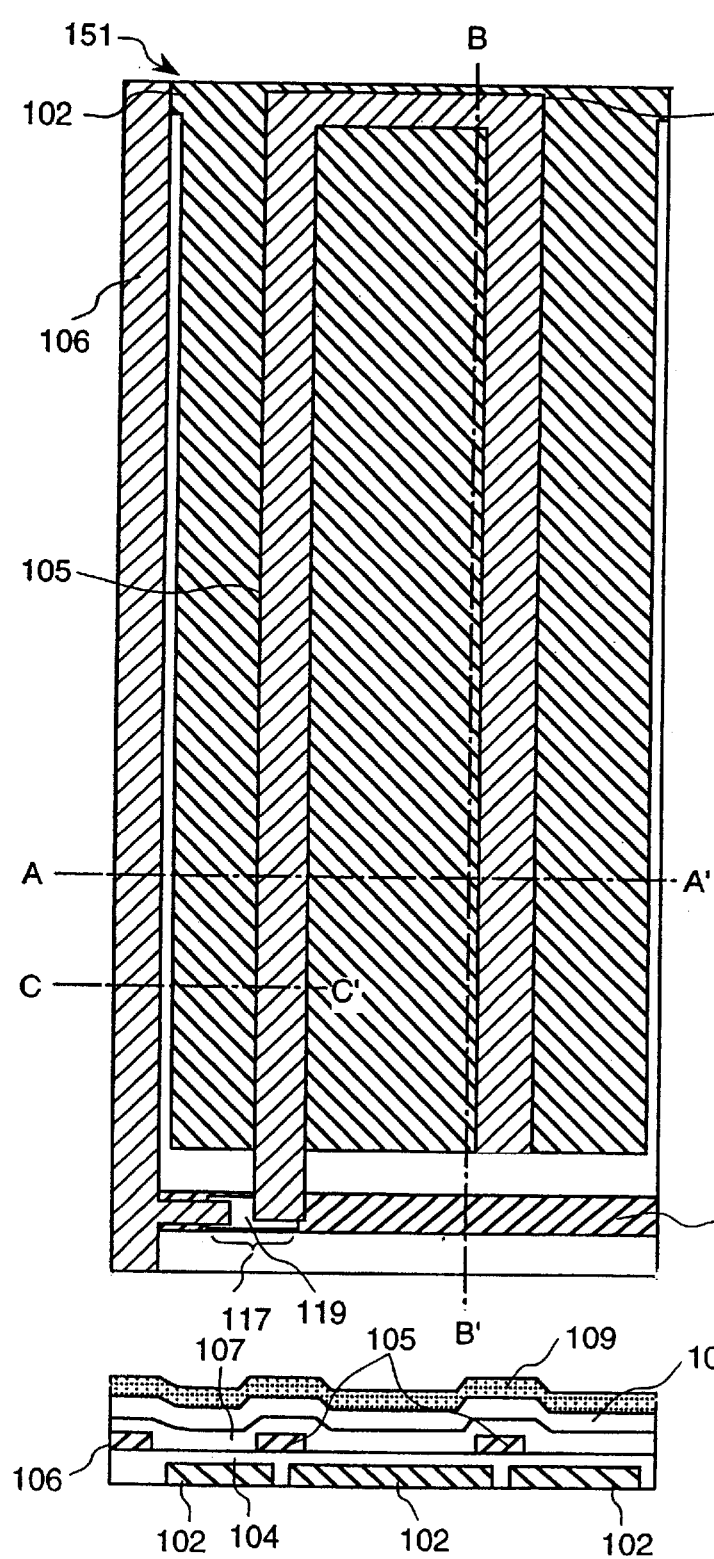
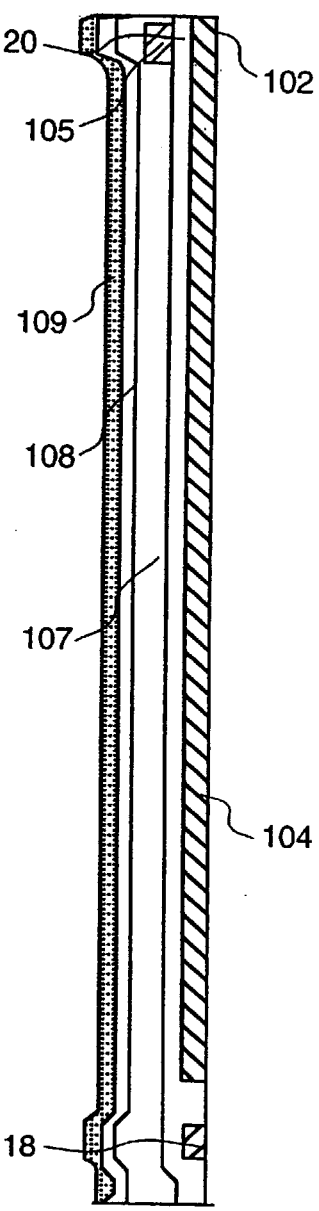
FIG. 4A
FIG. 4B

LIQUID CRYSTAL DISPLAY DEVICE

BACKGROUND OF THE INVENTION

The present invention relates to an active matrix type of liquid crystal display device.

In general, in a liquid crystal display device, an electric field is applied to liquid crystal molecules of a liquid crystal layer interposed between a pair of substrates to change the alignment direction of the liquid crystal molecules. A display produced by the liquid crystal device results from a selective change of the optical characteristic caused by a change in the alignment direction of the liquid crystal molecules.

The typical conventional active matrix liquid crystal display device which operates in a twisted nematic display mode (TN) has electrodes which are arranged on each of a pair of substrates having liquid crystal material disposed therebetween, and the direction of electric field applied to the liquid crystal material is set so as to become nearly normal to the substrate interface, whereby a display is produced by using the optical rotary power of the liquid crystal material. The most important problem in a liquid crystal display device operating in the TN display mode is that is has a narrow view angle.

On the other hand, U.S. Pat. No. 4,345,249, WO91/10936 discloses a liquid crystal display device which operates in the in-plane switching (IPS) mode, in which an electric field having a component nearly parallel to the substrate surface is produced using interdigital electrodes so as to cause rotational movement of the liquid crystal molecules nearly within a plane, whereby a display is produced using the birefringence of the liquid crystal material. The IPS mode is caused by in-plane switching of the liquid crystal molecules, and it has the advantages of providing a wide viewing angle and low storage capacitance compared to the conventional TN mode. Therefore, the IPS mode is a promising mode of operation for a new liquid crystal display devices, replacing the TN mode, and it is one of technologies which has seen rapid progress in recent years.

Further, Japanese Patent Application Laid-Open No. 9-73101 discloses a liquid crystal display device operating in the IPS mode in which at least one of the electrodes to be supplied with a voltage is formed of a transparent conductive film to improve the transmittance. A bright liquid crystal display device having good viewing characteristics (brightness contrast ratio, gray scale reversal) as described above has potential for application to a monitor or a television set having a large display area.

However, although the IPS mode type of liquid display device has a good display performance, as described above, display defects such as display unevenness, a sticking image referred to as an after image, and the like, sometimes appear when it is used for long time. Particularly, the sticking image or after image is recognized as a phenomenon that occurs when one pattern is displayed for a long time, and after that, when another pattern is displayed, the former pattern is displayed at the same time. It is also recognized that this problem is one of the factors which serves to degrade the liquid display performance.

The cause of the after image phenomenon is not clear yet, but the display defect of the after image and sticking image in the conventional TN mode type of liquid crystal display device is estimated to be caused by the fact that a direct current charge is accumulated in the interface of the liquid crystal alignment layer of each pixel because absorbing of ionic components to the alignment layer itself or to the surface of the alignment layer, which effect a change in the effective voltage. That is, the display defect of after image and sticking image is believed to be caused by the fact that the electric potential of the applied voltage is not eliminated within the response time, but is held and remains in the alignment layer of the pixel electrode or in the interface between the liquid crystal and the alignment layer, which changes the effective voltage.

In the TN mode, the correlation between the after image phenomenon and the residual DC voltage described above has been studied, and it has become gradually more clear that the problem of the after image phenomenon can be solved by reducing the residual DC voltage. Therefore, the alignment layer of the conventional TN mode requires a property in which the DC charge is hardly accumulated, that is, an alignment layer having a small residual DC voltage component. For example, in the technology relating to the TN mode type of liquid crystal display device as disclosed in Japanese Patent Application Laid-Open No. 8-54631, by considering that the after image is caused by absorption of ionic impurities in the liquid crystal into the alignment layer due to a generated driving DC voltage which accumulates the electric field, a method of using a low resistance alignment layer has been proposed in order to moderate the electric field accumulated in the alignment layer.

On the other hand, in the IPS mode, the following technologies for suppressing the after image have been proposed based on a cause of the after image similar to that of the TN mode described above. For example, in the technology disclosed in Japanese Patent Application Laid-Open No. 7-181439, by considering that the after image in the IPS mode is caused by a dipole of the liquid crystal molecules inducing polarization in the alignment layer, there has been proposed a method of suppressing the after image by setting the dipole moment of a side group in the liquid crystal molecules to a value below 3 Debye in order to reduce the polarization induced in the alignment layer. Further, in the technology in regard to an IPS mode liquid crystal display device as disclosed in Japanese Patent Application Laid-Open No. 7-159786, in order to rapidly modify the charge due to polarization produced in the liquid crystal layer, the alignment layer and the insulation film, there has been proposed a method of using an alignment layer and an insulation film having a surface resistance value within $3.3 \times 10^{11}$ to $2.5 \times 10^{18}$ $\Omega/cm^2$, and there also has been proposed a method of reducing the after image by specifying a relative relationship of relaxation times expressed by a dielectric constant and a specific resistance of each of the liquid crystal material, the alignment layer and the insulation film. Further, in the technology in regard to an IPS mode type of liquid crystal display device as disclosed in Japanese Patent Application Laid-Open No. 10-123526, there has been proposed a method of reducing the after image by using an alignment layer having a high ion adsorption in the substrate opposite to the substrate on which a group of electrodes for applying an electric field to the liquid crystal is formed.

There is a correlation between the after image phenomenon and the residual DC voltage in the conventional TN mode, as described above. The correlation was studied for the IPS mode, and the following results were obtained.
(1) There was little significant difference in the residual DC voltage between a liquid crystal display element not causing the after image and a liquid crystal display element causing the after image.
(2) In the IPS mode, there were some liquid crystal display elements in which sticking image semipermanently continued, and the dark level was decreased, and the contrast was substantially decreased.

It was also clarified from investigation of the alignment direction of liquid crystal in the regions of the after image and sticking image that some alignment directions were rotated from the initially set alignment direction toward the alignment direction at driving by a very small angle, and they had not completely returned to the initial alignment direction, which caused decrease in contrast and gray scale reversal between adjacent pixels, thereby to degrade the image quality.

It is estimated from the above-stated facts that the after image and sticking image phenomenon which occur in the IPS mode are based on an after image mechanism specific to the IPS mode which is completely different from the mechanism in the conventional TN mode. It is necessary to solve the problem produced by a sticking image and afterimage specific to the IPS mode in which the liquid crystal is operated in the substrate plane to produce a display using the birefringence of the liquid crystal. Further, in the IPS mode of operation of a liquid crystal display device of the high transparent type in which movement of the liquid crystal on the electrode surface is also used for image display by employing transparent electrodes, the problem of after image also occurs at the same level or more severely. Therefore, a countermeasure against these problems of after image is required.

SUMMARY OF THE INVENTION

An object of the present invention is to provide a high-quality liquid crystal display device with less unevenness of display caused by a sticking image and an after image, the liquid crystal display device being of the IPS mode type in which a display is produced by causing rotational movement of liquid crystal molecules nearly within a plane and by using the birefringence of the liquid crystal.

Another object of the present invention is to provide a high-quality liquid crystal display device which is suitable for mass production.

According to an embodiment of a liquid crystal display device in accordance with the present invention, pixel electrodes and common electrodes and active elements are arranged on at least one substrate, and the liquid crystal material of the liquid crystal layer is controlled to produce a display by applying a voltage between the pixel electrode and the common electrode. A pair of alignment layers individually formed on surfaces in contact with the liquid crystal layer of the pair of substrates are made of an organic polymer of the polyamic acid group or polymamide ester group having a relative imidization ratio above 60%.

It is preferable that the alignment layer is made of an organic polymer of the polyamic acid group or polymamide ester group having a relative imidization ratio above 70%.

It is preferable that the polyamic acid group organic polymer contains at least one group selected from the group consisting of the methyl ester group, ethyl ester group and propyl ester group.

According to an embodiment of a liquid crystal display device in accordance with the present invention, pixel electrodes and common electrodes and active elements are arranged on at least one substrate, and the liquid crystal of the liquid crystal layer is controlled to produce a display by applying a voltage between the pixel electrode and the common electrode, and a pair of alignment layers individually are formed on surfaces in contact with the liquid crystal layer of the pair of substrates. At least one layer of an insulation film is disposed between the alignment layer, on a side of the substrate having the electrodes formed thereon, and an electrode which is closer to the alignment layer between the pixel electrode and the common electrode.

Further, the thickness T of the insulation film is larger than a value of one fourth of an interval L between the pixel electrode and the common electrode. Furthermore, it is particularly preferable that the thickness T of the insulation film is larger than a value of one half of an interval L between the pixel electrode and the common electrode. Further, it is preferable that the magnitude of the dielectric constant $\in_{PAS}$ of the insulation film is smaller than an average dielectric constant $\in_{LC}$ of the liquid crystal layer. Therein, the average dielectric constant $\in_{LC}$ of the liquid crystal layer is a value which can be calculated as a dielectric constant spatially averaged with respect to the liquid crystal layer using the following equation.

$$\in_{LC} = (\in_{\parallel} + 2\in_{\perp})/3$$

where $\in_{\parallel}$ is an alignment vector of the liquid crystal which is the component parallel to the molecular axis, and $\in_{\perp}$ is an alignment vector of the liquid crystal which is the component perpendicular to the molecular axis.

Further, the liquid crystal display device is constructed so that an interval L between the pixel electrode and the common electrode within a display region, where change of an optical characteristic due to liquid crystal movement contributes to the display, and the thickness D of the liquid crystal layer within the display region may satisfy the relation L<2D.

Furthermore, any level difference on the surface of the alignment layer in contact with the liquid crystal at the uppermost portions of the pixel electrode and the common electrode is flattened by the insulation film and/or the alignment layer. Further, it is preferable that any level difference on the surface of the alignment layer in contact with the liquid crystal on the side of the substrate is flattened below 50 nm.

Further, the insulation film is formed in a range covering over all the display region where a change of an optical characteristic due to liquid crystal movement contributes to the display.

Further, according to another embodiment of a liquid crystal display device in accordance with the present invention, pixel electrodes and common electrodes and active elements are arranged on at least one of the substrates, and the liquid crystal of the liquid crystal layer is controlled to produce a display by applying a voltage between the pixel electrode and the common electrode, and at least two layers of insulation films are disposed between the pixel electrode and the common electrode.

The liquid crystal display device is constructed such that at least one layer of an insulation film is disposed between the alignment layer on a side of the substrate having the electrodes formed thereon and an electrode which is closer to the alignment layer between the pixel electrode and the common electrode, or such that at least one layer of the insulation films interposed between the pixel electrode and the common electrode is an inorganic insulation film made of at least one kind of material selected from the group consisting of silicon nitride, silicon oxide and polysiloxane group materials.

Further, the liquid crystal display device is constructed such that the insulation film is made of at least one kind of organic polymer selected from the group consisting of polyimide group polymers, acrylic group polymers and epoxy-acrylate group polymers.

Further, the liquid crystal display device is constructed such that the insulation film is composed of two layers including an organic insulation film and an inorganic insulation film.

Further, according to the other embodiment of a liquid crystal display device in accordance with the present invention, the pair of alignment layers individually formed on the surfaces in contact with the liquid crystal layer of the pair of substrates are made of an organic polymer selected from the group consisting of polyamic acid group polymers and polyamide ester group polymers having a relative imidization ratio above 60%. It is particularly preferable that the alignment layer is made of an organic polymer selected from the group consisting of polyamic acid group polymers and polyamide ester group polymers having a relative imidization ratio above 70%. Further, the polyamic acid group organic polymer contains at least one group selected from the group consisting of methyl ester group, ethyl ester group and propyl ester group.

Further, the liquid crystal display device is constructed such that a surface elastic modulus of the pair of alignment layers formed on the surfaces in contact with the liquid crystal layer of the pair of substrates is larger than 1 GPa.

Further, the liquid crystal display device is constructed such that a glass transition temperature Tg of interfaces between the pair of alignment layers formed on the surfaces in contact with the liquid crystal layer of the pair of substrates and the liquid crystal layer is higher than a nematic-isotropic phase transition temperature T(N-I) of a liquid crystal composition forming the liquid crystal layer.

Further, the liquid crystal display device is constructed such that the glass transition temperature Tg of interfaces between the pair of alignment layers formed on the surfaces in contact with the liquid crystal layer of the pair of substrates and the liquid crystal layer is higher than 220° C.

Further, the alignment layer is made of an organic polymer of dehydration ring closure of polyamic acid composed of diamine compounds expressed by a chemical formula N2N—R—NH2 and tetracarboxilic acid anhydride expressed by a chemical formula

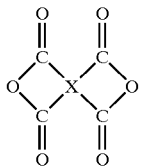

and a total number of bonding groups making a molecular axis of the polymer rotatable such as —O—, —S—, —CH$_2$—, —C(CH$_3$)$_2$—, —C(CF$_3$)$_2$—, —SO$_2$—, a bonding group in the meta position, and a bonding group in the ortho position contained in the R position and the X position in the repetitive structure of the organic polymer is equal to and less three.

Further, in accordance with the present invention, the at least one of the pair of alignment layers is a photo-reactive material layer. Furthermore, the alignment layer is formed by irradiating nearly linearly polarized light onto the layer made of the photo-reactive material.

Further, the present invention is effective in the case where a pretilt angle of the liquid crystal layer is smaller than 5 degrees.

Further, in the liquid crystal display device, at least one of the pixel electrode and the common electrode is formed of a transparent electric conductive film. The transparent electric conductive film is an ion doped titanium oxide film or an ion doped zinc oxide (ZnO) film.

Further, in the liquid crystal display device, the alignment control directions of the liquid crystal in the two interfaces between the liquid crystal layer and the pair of substrates are nearly equal to each other.

BRIEF DESCRIPTION OF DRAWINGS

FIG. 2 is a plan view showing the electrode structure of the first embodiment of the liquid crystal display device in accordance with the present invention; and FIGS. 2A and 2B are sectional views taken along lines A–A' and B–B', respectively.

FIG. 4 is a plan view showing the electrode structure of the second embodiment of the liquid crystal display device in accordance with the present invention; and FIGS. 4A and 4B are sectional views taken along lines A–A' and B–B', respectively, in FIG. 4.

FIGS. 8A and 8B are sectional views taken along lines A–A' and B–B', respectively, in FIG. 8.

DESCRIPTION OF THE PREFERRED EMBODIMENTS

Initially, the operating principles of the IPS mode liquid crystal display device, to which the present invention relates, will be explained with reference to FIGS. 10A to 10C.

Figure 10A:
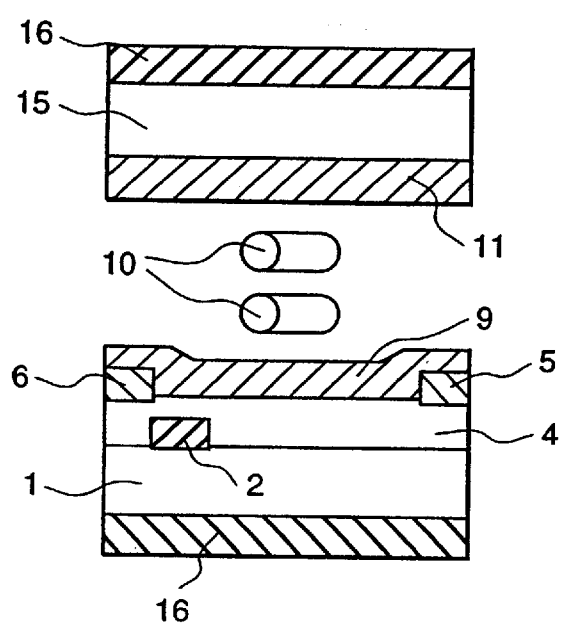
FIGS. 10A to 10D are diagrams illustrating movement of liquid crystal molecules of the liquid crystal display device operating in an IPS mode in accordance with the present invention.
Figure 10B:
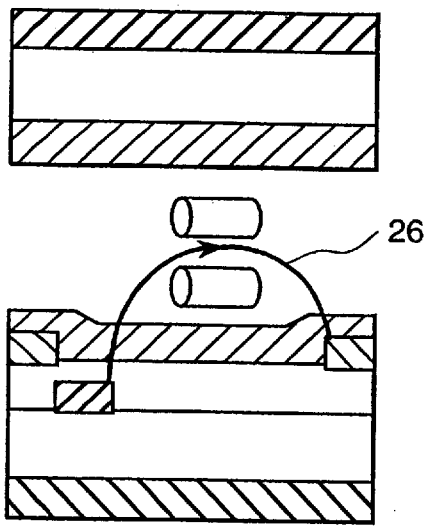
Figure 10C:
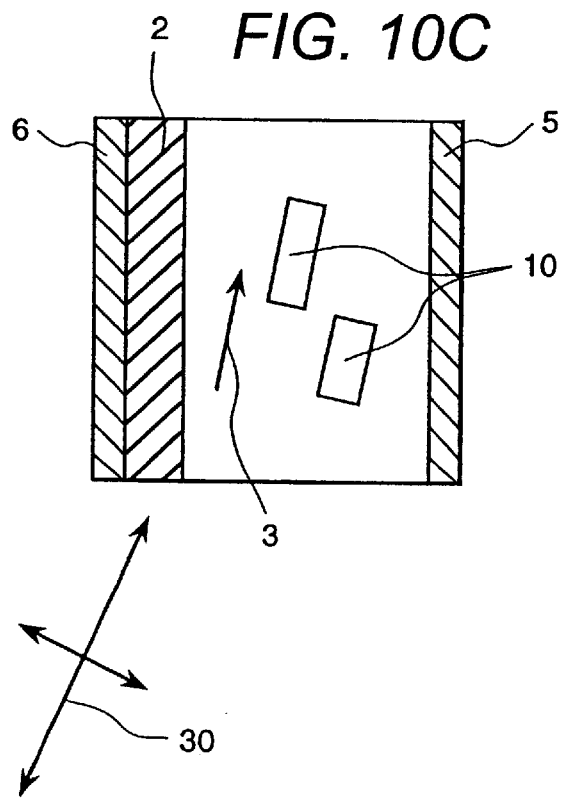
Figure 10D:
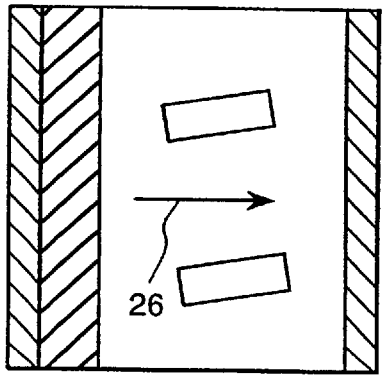

FIGS. 10A and 10B are cross-sectional views showing movement of liquid crystal molecules within one pixel of the liquid crystal display device operating in the IPS mode, and FIGS. 10C and 10D are front views showing movement of the liquid crystal molecules.

FIG. 10A shows the side cross section of the cell under the condition of not applying a voltage, and FIG. 10C is the front view at that time. Line-shaped electrodes 2, 5 are formed inside one of the substrates, and both substrate surfaces of the pair of substrates are alignment layers 9, 11, and a liquid crystal composition 10 is disposed between the substrates. The anisotropy of the dielectric constant of the liquid crystal composition in this example is assumed to be positive. However, in the case of a negative liquid crystal composition, the IPS mode can be similarly realized merely by exchanging the directions of the major axis and the minor axis of the liquid crystal molecule.

The rod-shaped liquid crystal molecules 10 are alignment controlled by bonding with the alignment layers 9, 11 so as to be aligned in a direction 30 having a small angle to the longitudinal direction of the electrodes 2, 5 in both substrate interfaces (the front view of FIG. 10C), and under the condition of not applying a voltage, the liquid crystal molecules 10 are in a state where they are uniformly aligned in the initial alignment direction within the liquid crystal layer. When an electric field 26 is applied to the liquid crystal composition layer by applying different electric potentials individually to the pixel electrode 5 and the common electrode 2 to form an electric potential difference between them, the direction of the liquid crystal molecules is changed to the direction of the electric field by the interaction between the anisotropy of dielectric constant of the liquid crystal composition and the electric field, as shown in FIG. 10B and FIG. 10D. At that time, the optical characteristic of the liquid crystal display device is changed by the action of the anisotropy of dielectric constant of the liquid crystal composition and a polarizing plate 16, and a display is produced by the change.

The after image and sticking image phenomenon to be solved by the present invention is a problem because the phenomenon causes a large brightness change in the dark level or the gray level range where the sense of sight of a human being is very sensitive.

The after image phenomenon will be described below.

When an electric field for producing a is applied in a TN mode liquid crystal display device using a plane-shaped transparent electric conductive film made of indium tin oxide (ITO) or the like, a uniform electric field is formed over all of the display region, except part of the regions at the electrode edges. Concentration of the electric field occurs in the electrode edge region in a different way from that in the central portion, and, accordingly, movement of the liquid crystal molecule itself in the electrode edge region is sometimes different from that in the central region where the uniform electric field is formed. Further, it is known that when ionic components are contained in the liquid crystal material, the ionic components peculiarly gather at the electrode edge regions where the electric field is concentrated and cause display defects, such as the after image. Therefore, in the TN mode type of liquid crystal display device, the effect of the display defects is eliminated by shading the electrode edge regions using a black matrix or the like.

On the other hand, in the IPS mode type of liquid crystal display device, since the electric field is applied using long and narrow interdigital or rectangular electrodes, in addition to the region in which the electric field is applied nearly parallel to the substrate surface formed between the electrodes, the electrode edge regions are also used for display. Particularly, in a case where the number of the interdigital or rectangular electrodes is increased, or in the case where regions on electrodes are used for a display region of an image by forming at least one of the pixel electrodes and the common electrodes of transparent films, the effect of the electrode edge regions on the display becomes large and can not be neglected because the ratio of the area of the electrode edge regions where electric field is easy to concentrate is increased. Further, in a case where the electrode interval L is narrow compared to the thickness D of the liquid crystal layer, the electric field concentration at the electrode edge is relatively increased, and the ratio of the area occupied by the electrode edge regions to the total display area is also increased.

As a result of an elaborate study to determine ways of suppressing the after image due to the electric field concentration, as described above, it was found that the following two methods were effective:

(1) a method of taking measures to cope with the after image in the interface between the liquid crystal layer and the alignment layer.

(2) a method of reducing the effect of the electric field concentration by changing the structure of the liquid crystal cell.

Each of these methods will be described below.

In the first place, when the electric field is strong, the ionic components in the liquid crystal are swept and gathered near the electrode edge, where the electric field is strongest, and adsorbed onto the alignment layer surface, and it is believed that remaining ones of the gathered ionic components are recognized as an after image.

As a result of an elaborate study of the inventors of the present invention, it was found that the adsorption behavior of the ionic components in the liquid crystal was strongly affected by changing the film quality of the alignment layer.

Figure 11:
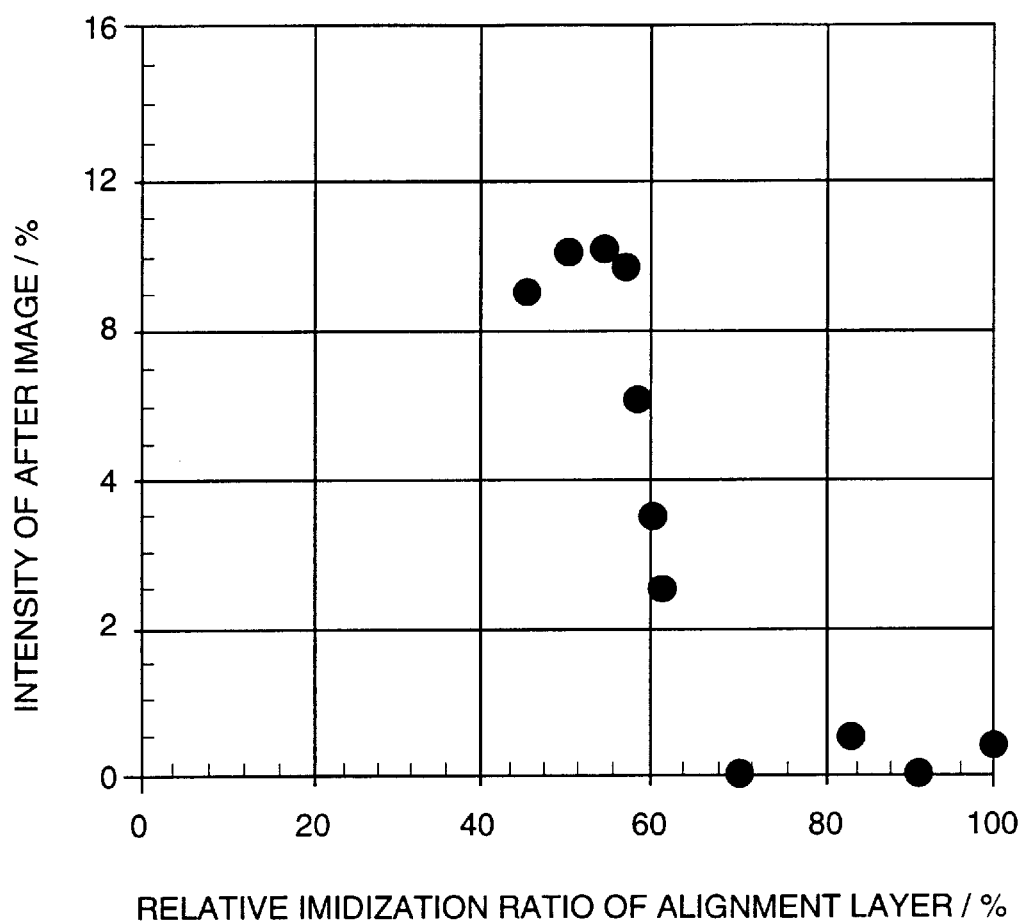
FIG. 11 is a graph illustrating the relationship between the intensity of an after image and the relative imidization ratio of an alignment layer, the relationship being used in the embodiments of the present invention.

In general, polyimide group materials are widely used for the alignment layer. An alignment layer made of a polyimide group material is usually formed by printing polyamic acid varnish of a precursor of polyimide, and then a high heat resistance polyimide film is obtained through dehydration condensation reaction, that is, imidization reaction by curing treatment. After that, by performing rubbing treatment, the film is used as the alignment layer of the liquid crystal. In general, a ratio of imidization, that is, a so-called imidization ratio, is substantially affected by the material composition, that is, the composite components of anhydrides and diamine compounds, and, further, by processing conditions such as curing temperature and curing time. As a result of a study using several kinds of alignment layers made of polyamic acid by the inventors of the present invention, it was found that the intensity of the after image depends on the molecular structure of anhydrides and diamine compounds composing polyimide or polyamic acid, but rather strongly correlates with the relative imidization ratio. FIG. 11 shows the correlation between the intensity of an after image and the relative imidization ratio for combinations of alignment layers made of various polyamic acid compounds to liquid crystal constituents different in compositions. Therein, the relative imidization ratio is defined as follows. By using the ratio $R=I(C=C)/I(C-N)$ of the dilatational oscillation peak intensity $I(C-N)$ of imide bonding near 1380 $cm^{-1}$ on an infrared absorption spectrum to the dilatational oscillation peak intensity $I(C=C)$ of benzene ring skeleton near 1500 $cm^{-1}$ on an infrared absorption spectrum, the above ratio $R_0=I_0(C=C)/I_0(C-N)$ for an imidized sample obtained by performing curing under the condition of 300° C. for 1 hour that polyamic acid is estimated to be nearly completely imidization-reacted is set to 100, and thus the following relative value is defined as the relative imidization ratio.

$$\text{relative imidization ratio } (\%) = (R/R_0) \times 100 = \{I(C=C)/I(C-N)\}/\{I_0(C=C)/I_0(C-N)\} \times 100 \quad (1)$$

The method of measuring the relative imidization ratio is performed by cutting a substrate having an electrode to form a piece, and by directly measuring the piece by the FT-IR-ATR method; or, the measurement is performed by grinding the piece to make sample powder and to form micro pellets from the powder and then measuring the IR absorption spectrum, and, after that, by performing imidization treatment by curing the samples under the condition of 300° C. for 1 hour and then performing a similar measurement. Then, the relative imidization ratio is determined according to the above equation (1). It can be understood from FIG. 11 that the intensity of the after image is drastically decreased in the range of the relative imidization ratio above 60%, and, accordingly, it is clear that the relative imidization ratio above 60% is effective for the alignment layer. Further, it is also clear that the relative imidization ratio above 70% is preferable. Further, it has been found that, in addition to polyamic acid, the same effect can be obtained by using polyamic acid ester, and that polyamic acids having a relatively short alkyl part, such as methyl ester, ethyl ester, propyl ester, are also effective.

Further, since the correlation between the intensity of the after image and the magnitude of the DC voltage remaining near the pixel electrode is not found as described above, it can be estimated that the sticking image and the after image are caused not only by electrical phenomenon, but rather are based on a recovering difficulty of twist deformation of the liquid crystal molecule in the substrate plane direction, that is, so-called interaction of the liquid crystal/alignment layer interface.

As a result of an elaborate study by the inventors of the present invention, the cause of the after image phenomenon can be recognized as follows. That is, the surface of the alignment layer restricting the direction of the initial alignment of the liquid crystal molecules is elastically deformed by a rotation torque which is generated by in-plane twist deformation of the liquid crystal molecules due to application of the electric field, and the deformation creep is a remaining strain (a remaining image) in the liquid crystal alignment direction. In a case where the remaining strain is recovered with a finite delay time, the remaining strain becomes an after image. In a case where the remaining strain is a permanent deformation, the remaining strain becomes a sticking image.

The magnitude of rotation torque W of the liquid crystal molecule can be expressed by the following equation.

$$W = K_2 \cdot \Delta\theta/dm \quad (2)$$

Therein, $K_2$ is a twist elastic constant of the liquid crystal, $\Delta\theta$ is a maximum rotation angle of the liquid crystal, dm is a distance from the alignment layer interface to a portion where the liquid crystal molecules are most rotated, and the distance is generally considered to be equivalent to one-half of the liquid crystal cell gap. However, in the case where the electric field concentrates to a position near the electrode edge, as described above, it is estimated that the rotation angle $\Delta\theta$ in that region becomes larger than an average rotation angle of the whole liquid crystal layer, and the maximum rotation angle region approaches close to the position near the electrode by an amount corresponding to the stronger electric field near the electrode to decrease the distance dm from the alignment layer interface to the portion where the liquid crystal molecules are most rotated, and, thus, the effective rotation torque W is increased. Therefore, in the region near the edge of the interdigital electrode or the rectangular electrode where the electric field concentration is apt to occur, the amount of elastic deformation in the alignment layer surface is increased. Particularly, in the case where the electrode is formed of a transparent conductive film, the ratio is further increased.

Therefore, as a method of reducing the occurrence of such an after image phenomenon as described above, the effective method is characterized in that (1) the magnitude of rotation torque W by the in-plane twist deformation is decreased by using a liquid crystal composition having a small twist elastic constant, or (2) an elastic modulus of the alignment layer is increased by forming a polymer surface having a high elastic modulus which is hardly affected by the rotation torque W due to movement of the liquid crystal molecules.

As specific measures for increasing the elastic modulus of the alignment layer, it is preferable that the molecular structure of the polymer composing the alignment layer is a rigid and linearity-rich structure, and that the molecular weight is as small as possible. Further, it is preferable to form a mono-dispersive system. Further, it is preferable that the strength of the alignment layer is dynamically increased by forming a higher order network through photo cross-linking reaction after printing, curing, and alignment treatment with rubbing of the alignment layer. The elastic modulus can be increased by increasing the molecular weight above 5,000 to increase the cohesive force between the polymer chains. However, on the other hand, when the molecular weight is larger than 300,000, entanglement of the polymer chains sometimes occurs under a melting condition of the alignment layer varnish to prevent packing of high density polymer chain.

Further, it is preferable that the total number of bonding groups making a molecular axis of the polymer rotatable, such as —O—, —S—, —$CH_2$—, —$C(CH_3)_2$—, —C $(CF_3)_2$—, —$SO_2$—, bonding group in the meta position, and bonding group in the ortho position contained in the repetitive structure of the organic polymer, is three or less. The reason is that in a case where there are many bonding groups as described above, although diffusion of the polymer main chain does not occur, the elastic modulus of the alignment layer polymer is decreased because rotation around the molecular axis becomes easy and local thermal motion becomes possible. Such a phenomenon is known as side chain relaxation (Tg(b)) which appears in the temperature characteristic of the elastic modulus. In the alignment layer used for the conventional TN mode, a method of introducing a side chain such as n-alkyl group is used in order to control the pretilt angle. However, in the IPS made, in order to secure a wide viewing angle, and from the viewpoint described above, it is preferable to use a polymer which has few in a side group chromophore with a long chain branch causing a pretilt angle such as n-alkyl group, or a polymer which does not have a high volume side chain substituent group. Therefore, employing such a polymer for the alignment layer can suppress the pretilt angle (interface tilt angle) to a low angle below 5 degrees, and is effective to secure the wide viewing angle characterizing the IPS mode liquid crystal display device. Accordingly, the short length alkyl groups, such as methyl ester group, ethyl ester group and propyl ester group, are suitable for the polyamide ester group alignment layer described above.

Further, it is known that the elastic modulus of a polymer alignment layer is strongly affected by the surrounding environmental conditions, particularly, by temperature. From this viewpoint, as an index for selecting a high elastic modulus alignment layer, there is a glass transition temperature Tg of alignment layer polymer in addition to the elastic modulus. The alignment layer is guaranteed to have a higher elastic modulus as the glass transition temperature Tg is higher. By taking the correlation between the magnitude of Tg and the magnitude of after of image in the IPS mode liquid crystal display device, which is the problem to be solved by the present invention, it has been found that the alignment layers having a Tg exceeding 220° C. can reduce the after image to a degree which can satisfy an allowable value of display performance. Therefore, it is preferable that the glass transition temperature Tg of the alignment layer is higher than 220° C. Since the glass transition temperature Tg is a value for the bulk of the alignment layer polymer, the glass transition temperature Tg actually relating to the liquid crystal/alignment layer interface is estimated to be decreased by about 100° C. at a maximum. Therefore, in the temperature range from −30° C. to 70° C. in which operation of the liquid crystal display device is actually guaranteed, it is hardly expected that the elastic modulus of the alignment layer surface will be decreased. Further, in an actually used liquid crystal cell, it is estimated that there is the following relationship between the interface glass transition temperature Tg in the alignment layer/liquid crystal interface and the nematic-isotropic phase transition temperature T(N-I) of the liquid crystal. It can be understood from the above-mentioned equation (2) that the magnitude of rotation torque W of the liquid crystal is in proportion to the twist elastic constant $K_2$ of the liquid crystal. Further, the twist elastic constant $K_2$ of the liquid crystal is gradually decreased as the temperature of the liquid crystal is increased, and it is rapidly decreased at the nematic-isotropic phase transition temperature T(N-I). That is, when the temperature of the liquid crystal is above the point T(N-I), the magnitude of rotation torque W of the liquid crystal becomes very small and the stress load to the alignment layer is substantially decreased. Therefore, in the case where the glass transition temperature Tg on the surface of or near the interface with the alignment layer is higher than the T(N-I) temperature of the liquid crystal (Tg>T(N-I)), the alignment layer surface is in a state near a very hard glass state. Therefore, the alignment layer surface is hardly affected by the rotation torque W of the liquid crystal, which is effective for suppressing and reducing the after image.

From the viewpoint described above, amine containing components and the other copolymeric components of composition materials of the alignment layer used in accordance with the present invention are as follows. For example, as aromatic diamine, there are p-phenylene diamine, m-phenylene diamine, 2,4-diaminotoluene, 2,5-diaminotoluene, 2,6-diaminotoluene, diaminodulene, benzidine, O-tolidine, 3,3'-dimethoxy benzidine, 4,4"-diaminotrrphenyl, 1,5-diaminnaphtalene, 2,7-diaminofluorene, 4,4'-diaminodiphnyl ether, 4,4'-diaminodiphenyl sulfide, 4,4'-diaminodiphenyl methane, 3,3'-dimethyl-4,4'-diaminodiphenyl methane, 2,5-diamnodiphenyl methane, 2,5-diaminopyridine, 4,4'-bis(p-aminophenoxy)biphenyl, 2,2'-bis{4-(p-aminophenoxy) biphenyl}propane, 2,2'-bis{4-(p-aminophenoxy) biphenyl}hexafluoro propane, 4,4'-bis(m-aminophenoxy) biphenyl sulfone, and so on. However, the amine containing components and the other copolymeric components are not limited to the above.

On the other hand, acid containing components and the other copolymeric components are as follows. For example, as aromatic tetracarboxylic acid anhydrides, there are pyromellitic acid anhydride, methyl-pyromellitic acid anhydride, dimethylene-trimellitic acid anhydride, 3,3',4,4'-benzophenone-tetracarboxylic acid anhydrides, 3,3',4,4'-biphenyl-tetracarboxylic acid anhydrides, dimethylene-trimellitic acid anhydride, 2,3,6,7-naphtalene-tetracarboxylic acid anhydride, 3,3',4,4'-diphenylsulfone-tetracarboxylic acid anhydride, 3,3',4,4'-diphenylether-tetracarboxylic acid anhydride, 3,3',4,4'-diphenylmethane-tetracarboxylic acid anhydride. As alicyclic tetracarboxylic acid anhydrides, there are 1,2,3,4-butane-tetracarboxylic acid anhydride, 1,2,3,4-biscyclobutane-tetracarboxylic acid anhydride, 1,2,3,4-cyclopentane-tetracarboxylic acid anhydride, and so on. However, the acid containing components and the other copolymeric components are not limited to the above.

Further, solvents are as follows. For example, usable solvents having a polarity are N-methyl-2-pyrrolidone, dimethyl formamide, dimethyl acetamide, dimethyl sulfoxide, sulfolane, butyl lactone, cresol, phenol, sycrohexanone, dimethyl imidazolidine, dioxane, tetrahydrofuran, buthyl cellsolve, buthyl cellsolve acetate, acetophenone, and so on.

Further, the following may be mixed with or reacted with the organic polymer, that is, amino group silane coupling agents such, as γ-amino propyl-triethoxy silane, δ-amino propyl-methyldiethoxy silane, N-β(aminoethyl) γ-amonopropyl-trimethoxy silane and so on; epoxy group silane coupling agents; titanate coupling agents; surface treating agents, such as aluminum alcholate, aluminum chelate, zirconium chelate and so on. The alignment layer can be formed through a common method, such as spin coating, printing, brush painting, spray methods.

The liquid crystals used are, for example, 4-substituent phenyl-4'-substituent cyclohexane, 4-substituent cyclohexyl-4'-substituent cyclohexane, 4-substituent phenyl-4'-substituent dicyclohexane, 4-substituent cyclohexyl-4'-substituent diphenyl, 4-substituent-4"-substituent terphenyl, 4-substituent biphenyl-4'-substituent cyclohexane, 2-(4-substituent phenyl)-5-primidine, 2-(4-substituent dioxane)-5-phenyl, 4-benzoic acid-4'-phenyl ester, 4-substituent cyclohexane carboxylic acid-4'-substituent phenyl ester, 4-substituent cyclohexane carboxylic acid-4'-substituent biphenyl ester, 4-(4-substituent cyclohexane carbonyloxy) benzoic acid-4'-substituent phenyl ester, 4-(4-substituent cyclohexyl) benzoic acid-4'-substituent phenyl ester, 4-(4-substituent cyclohexyl) benzoic acid-4'-substituent cyclohexyl ester, 4-substituent-4'-substituent biphenyl, and so on. Among these compounds, a mixed liquid crystal composition of multi-component system having alkyl group, alkoxy group, alkoxy methylene group, cyano group, fluoro group, difluoro group or trifluoro group in at least one of terminals of the molecule is used as the liquid crystal.

In addition to the polyimide alignment layer of which the alignment is controlled by rubbing treatment, it is possible to use a photo-reactive alignment layer which is processed through polarization light irradiation treatment so as to selectively cause photochemical reaction.

It has been considered that, in an alignment control method using a photo-reactive alignment layer, it is generally difficult to achieve strong twist bonding and a sufficient interface tilt angle (above several degrees). However, in the IPS mode, which is different from the vertical electric field mode typical of the conventional TN mode, it is known that the interface tilt is not necessary in principle, and the viewing characteristics are better as the interface tilt angle is smaller. The fact that the interface tilt angle is very small in the photo-reactive alignment layer is very convenient, on the other hand, and better a viewing characteristic can be expected to be obtained.

Further, by pre-mixing a polymer precursor curable with irradiation of light, heat or radiation rays into such a photo-reactive alignment layer material, and by performing the curing treatment together with the photo-alignment treatment at a time or before or after the photo-alignment treatment, the elastic modulus of the photo-reactive alignment layer can be made high, and, accordingly, the after image specific to the IPS mode can be further reduced. As another method, rather than mixing the polymer precursor described above, by interposing a transparent organic polymer layer having a thickness greater than that of the photo-reactive alignment layer between the photo-reactive alignment layer and the substrate to make the elastic modulus of the whole alignment layer higher, the object of the present invention can be attained. As material for the transparent organic polymer layer having a high insulation property, acrylic group or epoxy-acrylate group organic polymers are suitable.

Furthermore, it was determined that the after image phenomenon to be solved by the present invention was affected not only by the film property of the alignment layer but by the pixel structure. That is, it was found that the electric field concentration of the electrode edge region described above can be reduced by changing the pixel structure.

In detail, the density of the electric field in the electrode edge region can be reduced by interposing at least one layer of the insulation film between the alignment layer on the side of the substrate having the electrode group formed thereon and the electrode which is closer to the alignment layer between the pixel electrode and the common electrode. Further, the level difference equivalent to a thickness of the electrode is usually formed in the pixel electric region and the common electric region on the surface of the alignment layer. In such a case, the electric field concentration is caused by the effect of the shape. Therefore, it is effective to reduce the effect of the level difference edge by forming the insulation film so as to flatten the level difference. Further, the electric field concentration can be reduced more effectively as the thickness of the insulation film is increased, and is even more effective when a material having a small dielectric constant is used. It is desirable to use an insulation material having a dielectric constant smaller than the average dielectric constant of the liquid crystal layer. In order to form a flat insulation film having a thickness sufficient to moderate the electric field, a film forming method such as spinning, printing, dipping or the like is preferable. For example, an organic film generally having a lower dielectric constant compared to an inorganic film is effective, and a film made of an inorganic film material having a low dielectric constant and which is capable of forming a thick film, such as polysiloxane group, is also effective. Further, since the alignment layer made of a polyimide group material functions as an insulation film having a dielectric constant of about 4, the film thickness of the alignment layer is preferably thicker, similar to the insulation film described above. Furthermore, when one layer of the insulation film is insufficient to satisfy the thick film thickness, the flattened film and the insulation property at the same time, it is effective to form a laminated film composed of two or more layers in order to share these functions among the layers. For example, a desirable insulation film may be formed by laminating an organic film or an inorganic film, such as polysiloxane, with which it is easy to form a thick and flat film, on an inorganic insulation film made of silicon nitride or silicon oxide having a high insulation property.

Figure 1:
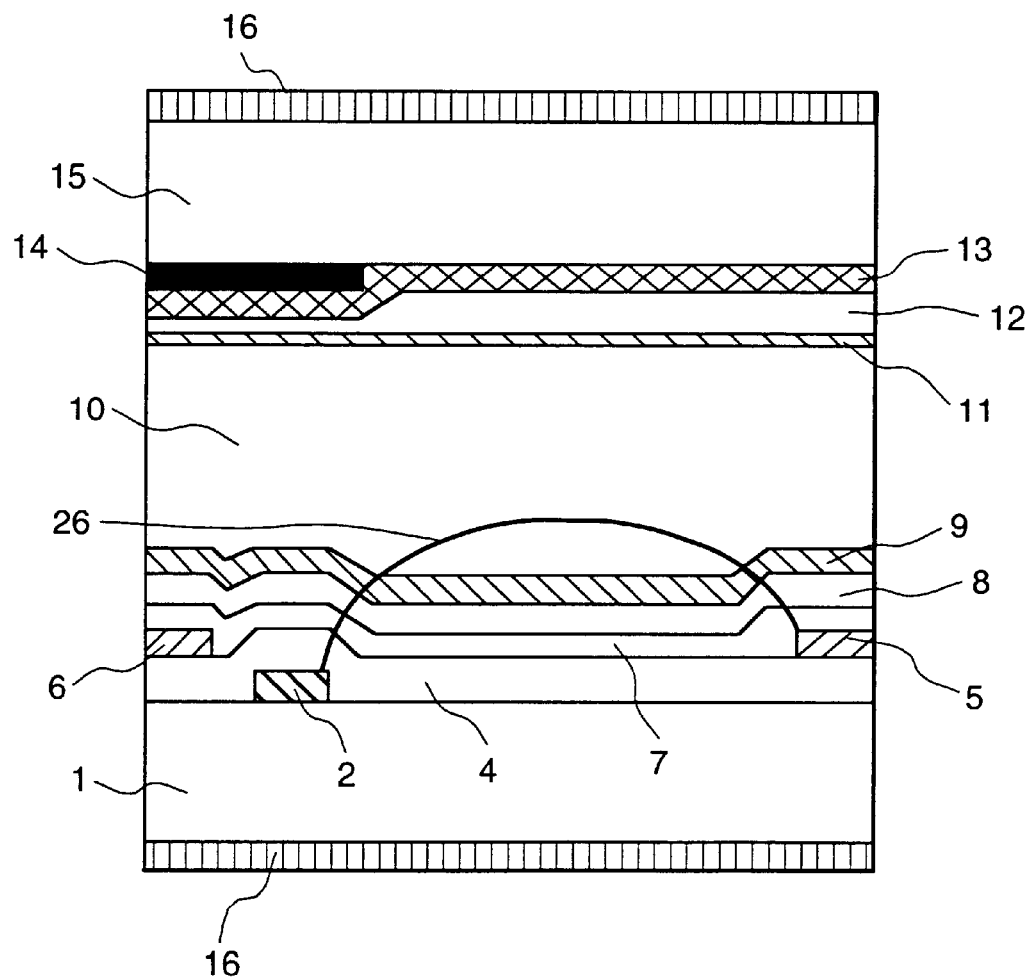
FIG. 1 is a cross-sectional view of a pixel portion, as seen along line C–C' in FIG. 2, illustrating the structure of a first embodiment of a liquid crystal display device in accordance with the present invention.

As a first embodiment in accordance with the present invention, a study was performed on a liquid crystal display device of the IPS mode type in which either of the pixel electrode and the common electrode, or both of the pixel electrode and the common electrode, are formed of transparent films. FIG. 1 is a cross-sectional view of a pixel portion illustrating the structure of the first embodiment of a liquid crystal display device in accordance with the present invention. FIG. 2 is a front view showing the electrode structure of the first embodiment of the liquid crystal display device in accordance with the present invention.

As shown in FIG. 1 and FIG. 2, the first embodiment of the liquid crystal display device 50 is composed of a pair of transparent glass substrates 1, 15; liquid crystal 10 interposed between the substrates 1, 15; a common electrode 2 and pixel electrode 5 formed on the substrate 1 so as to apply a voltage between them to generate an electric field having a component parallel to the substrate surface, as schematically shown by the reference character 26 in the figure; a signal electrode 6 and an active element of a thin film transistor (TFT) 17 formed in the substrate 1; alignment layers 9, 11 of the liquid crystal formed on the surfaces in contact with the liquid crystal 10 of the substrates 1, 15; and a polarizing plate 16 of an optical means for changing the optical characteristic corresponding to an alignment state of the liquid crystal. Therein, although a thin film diode may be used as the active element instead of the TFT, it is preferable to use the TFT, which has a good operating characteristic as a switching element.

In the first embodiment of the liquid crystal display device 50, an electric field 26 is generated between the common electrode 2 and the pixel electrode 5 by action of the thin film transistor 17 to induce switching motion of the liquid crystal molecules of the liquid crystal 10 within the plane nearly parallel to the substrate 1 so as to intersect with the electric field 26 at a right angle, and thereby perform image display.

A correlation between the film thickness of the insulation film 7, or the protective insulation film interposed between the pixel electrode 5 and the alignment layer 9, was studied using the first embodiment of the liquid crystal display device in accordance with the present invention as described above. As a result, it was found that the level of the after image was decreased as the film thickness of the insulation film 7 or the protective insulation film was increased.

By forming an insulation film in the electrode edge portion where the electric field is apt to be concentrated, the density of the electric lines of force is reduced, and the degree of concentration is moderated. Further, in order to cope with the recovering hardness of the interface due to the rotation torque W of the liquid crystal, it is effective that the distance dm from the electrode side interface to the portion where the liquid crystal molecules are most rotated is increased as much as possible.

FIG. 12($a$) is a graph showing the result of calculating the change of electric field intensity E at the middle position between the two rectangular electrodes having an electrode width w and an interval between the electrodes L to the distance d in the direction of liquid crystal layer thickness. FIG. 12($b$) is a graph showing the differential coefficient corresponding to FIG. 12($a$), that is, the plots of the rate of change of the electric field intensity.

Figure 12A:
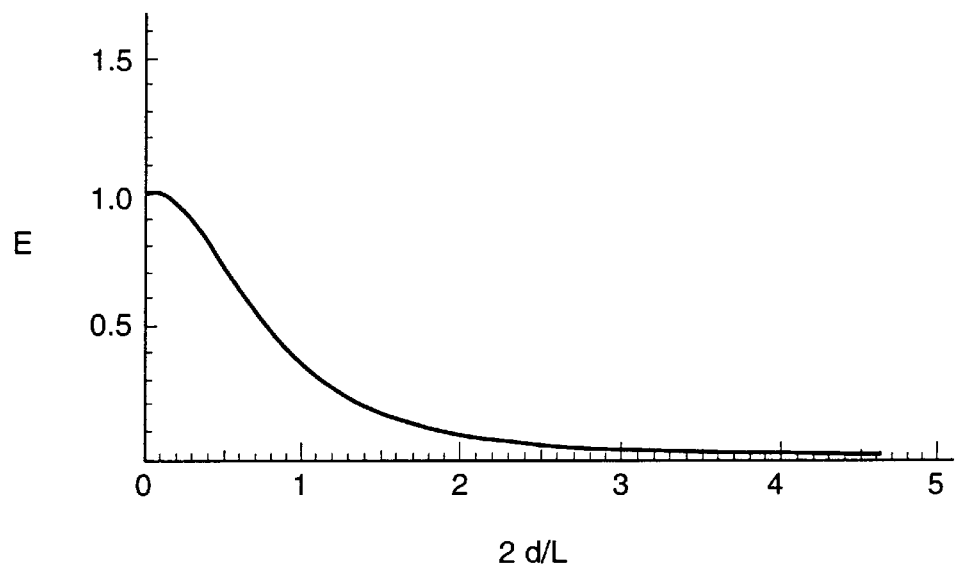
FIG. 12(a) is a graph illustrating the change of electric field intensity in a direction of the liquid crystal layer thickness versus the liquid crystal layer thickness normalized by distance between electrodes, the relationship being used in the embodiments of the present invention.

As the electrode width w is decreased, the relative change of the electric field intensity E shown in FIG. 12(a) is slightly decreased, but not so much. It can be understood from FIG. 12(a) that, within the range from the point near the electrode (d=0) to the vicinity of the alignment layer of the opposite substrate (d=D), the electric field intensity is strongest at a position near the electrode (2d/L≈0), and the electric field intensity is decreased as the distance is increased. Further, by dividing at the point L≈2D, a ratio of an electric field intensity to the electric field intensity at the vicinity of the electrode is within a fraction of one in the range L>2D. On the other hand, in the range L<2D, the ratio increases to one or more times as large as that in the range L>2D. Therefore, since the position dm, where the liquid crystal molecules are most rotated, approaches very close to the vicinity of the electrode in the range L<2D, it can be understood from the equation (2) that the rotation torque W acting on the surface between the liquid crystal and the alignment layer near the electrode becomes very large so as to increase the intensity of the after image.

Therefore, as shown in the first embodiment of the present invention, by forming the insulation film having a film thickness T composed of the insulation film 7 and the protective insulation film 8 between the alignment layer and the electrode near the alignment layer, the pixel electrode 5 in this case, the relative ratio of the electric field intensity E(D) at the vicinity of the alignment layer (d≈D) on the side opposite to the electrode to the electric field intensity E(d≈T) in the vicinity of the alignment layer (d≈T) on the electrode side can be increased. By doing so, the position dm, where the liquid crystal molecules are most rotated, can be made distant from the electrode interface so as to decrease the rotation torque W, and, accordingly, the intensity of the after image can be reduced and suppressed.

Figure 12B:
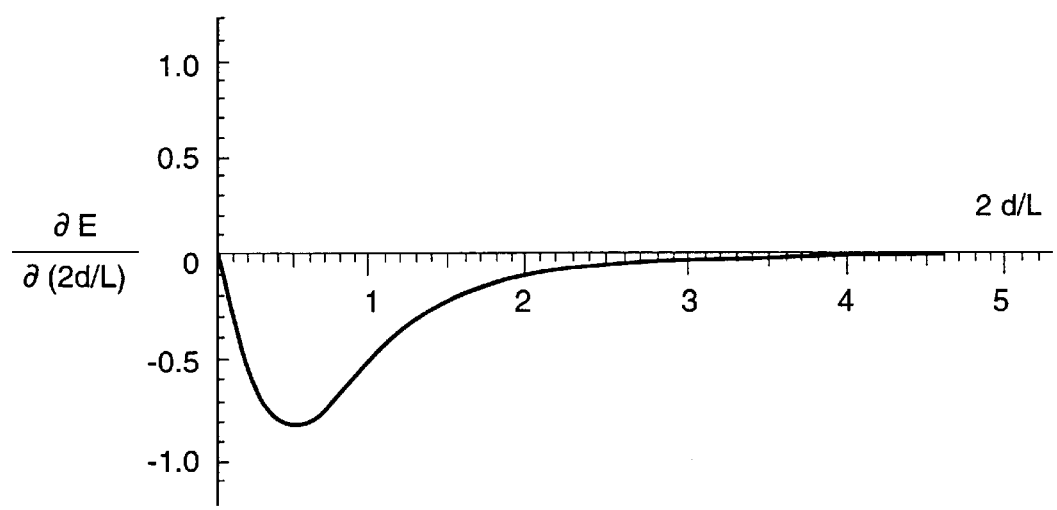
FIG. 12(b) is a graph illustrating the rate of change of the electric field intensity in a direction of the liquid crystal layer thickness versus the liquid crystal layer thickness normalized by the distance between electrodes which is shown in FIG. 12(a).

Further, it can be understood from FIG. 12(b) that the rate of the decrease of electric field intensity becomes lower in the range above the point where the rate of the decreasing change of the electric field intensity is the steepest, that is, above 2d/L≈½. Therefore, by forming the insulation film up to the point 2d/L≈½, that is, by making the film thickness T thicker than ¼ of the interval between the electrodes L, the change of the electric field intensity becomes gentle, and the electric field intensity at the vicinity of the electrode is relatively decreased to one-half; and, thus, the position dm, where the liquid crystal molecules are most rotated, can be made distant from the electrode interface. Further, it is effective to form the film thickness T of the insulation film to be larger than ½ of the interval between the electrode L, because the electric field intensity in the vicinity of the alignment layer can be further reduced. Further, the effect described above can be attained by use of a thinner film when the dielectric constant $\in_{PAS}$ of the insulation film is smaller; and, further, it is preferable that the average dielectric constant $\in_{LC}$ is also small, because the electric field intensity in the vicinity of the alignment layer can be effectively further reduced.

Next, as a second embodiment of the present invention, an IPS mode type of liquid crystal display device was studied.

In the IPS mode type of liquid crystal display device, at least one of or both of the pixel electrode and the common electrode, to which a voltage is applied to generate the electric field in the liquid crystal layer, are formed of transparent conductive films, and a storage capacitance is formed by overlapping at least parts of the pixel electrode and the common electrode with each other at an opening portion of the pixel, while securing the insulation by interposing an insulation film between them. The overlapping portion is used as a holding capacitance without decreasing the area of the opening portion of the pixel.

Figure 3:
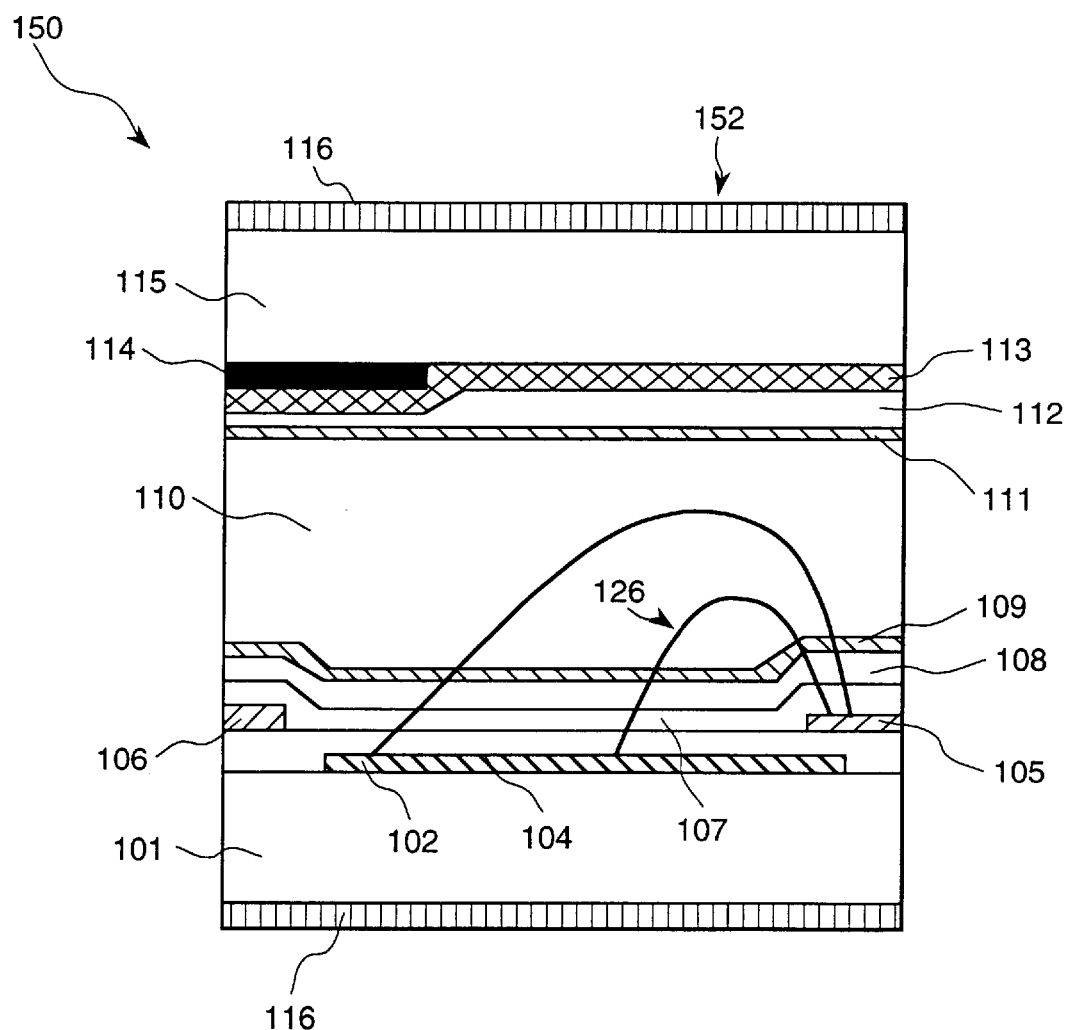
FIG. 3 is a cross-sectional view of a pixel portion, as seen along line C–C' in FIG. 4, illustrating the structure of a second embodiment of a liquid crystal display device in accordance with the present invention.

FIG. 3 is a cross-sectional view of a pixel portion illustrating the structure of a second embodiment of a liquid crystal display device in accordance with the present invention. FIG. 4 is a plan view showing the electrode structure of the second embodiment of the liquid crystal display device in accordance with the present invention.

As shown in FIG. 3 and FIG. 4, the second embodiment of the liquid crystal display device 150 is composed of a pair of transparent glass substrates 101, 115; liquid crystal 110 interposed between the substrates 101, 115; a common electrode 102 and pixel electrode 105 formed on the substrate 101 so as to apply a voltage between them to generate an electric field having a component parallel to the substrate surface, as schematically shown by the reference character 126 in FIG. 3; a signal electrode 106 and an active element of a thin film transistor (TFT) 117 formed on the substrate 101; alignment layers 109, 111 of the liquid crystal formed on the surfaces in contact with the liquid crystal 110 of the substrates 101, 115; and a polarizing plate 116 of an optical means for changing the optical characteristic corresponding to an alignment state of the liquid crystal.

In the second embodiment of the liquid crystal display device 150, at least one of the pixel electrode 105 and the common electrode 102 are formed of a transparent conductive film, and a storage capacitance is formed by overlapping at least parts of the pixel electrode and the common electrode though an insulation film 104 with each other at an opening portion of the pixel. An electric field 126 is generated between the common electrode 102 and the pixel electrode 105 by the action of the thin film transistor 117 to induce switching motion of the liquid crystal molecules of the liquid crystal 110 within a plane nearly parallel to the substrate 101 so as to intersect with the electric field 126 at a right angle, and thereby perform image display.

Further, in the second embodiment of the liquid crystal display device 150, it is possible to form an IPS mode type of liquid crystal display device having a structure in which at least one of or both of the pixel electrode and the common electrode, to which voltage is applied to generate the electric field in the liquid crystal layer, are formed of transparent conductive films, and a storage capacitance is formed by overlapping at least parts of the pixel electrode and the common electrode with each other at an opening portion of the pixel while securing the insulation by interposing an insulation film between them. The overlapping portion is used as a holding capacitance without decreasing the area of the opening portion of the pixel. In the liquid crystal display device having such a structure as described above, since the common electrode 102 in the lower layer does not need to be patterned in an interdigital shape, the manufacturing process can be simplified, and the capacitors can be formed. Such a liquid crystal display device was studied as a third embodiment of the present invention.

Figure 6:
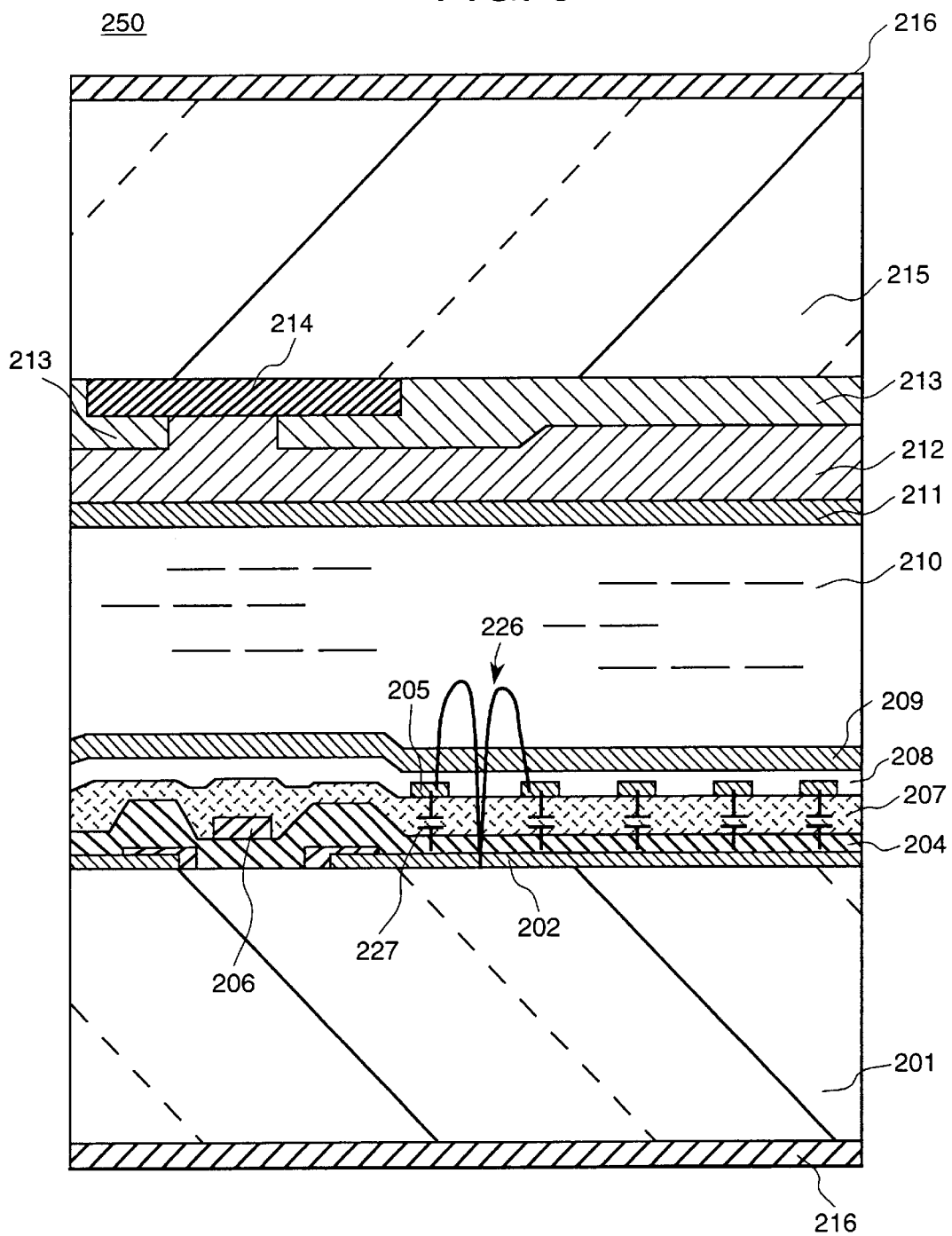
FIG. 6 is a cross-sectional view of a pixel portion, as seen along line A–A' in FIG. 7, illustrating the structure of a third embodiment of a liquid crystal display device in accordance with the present invention.
Figure 7:
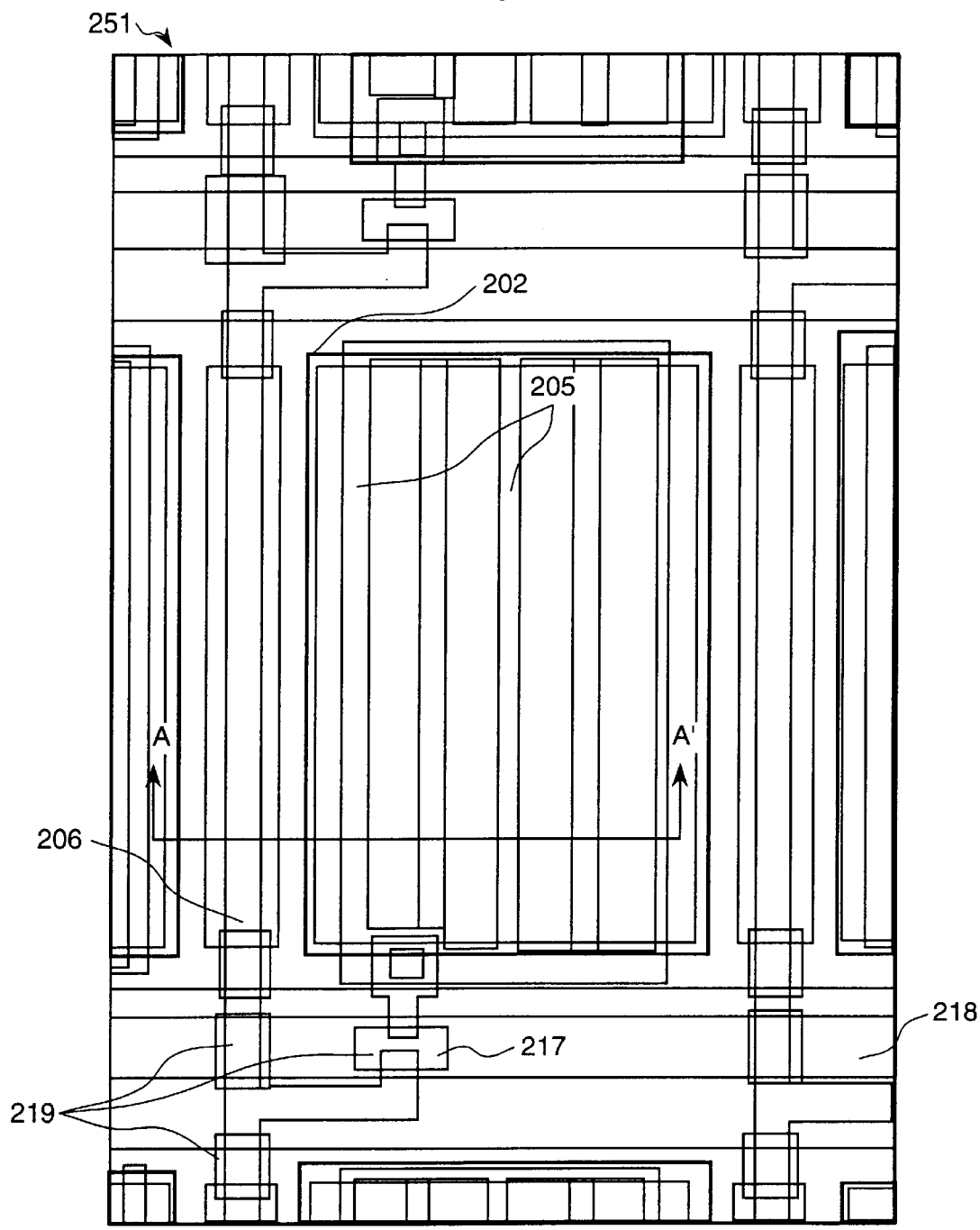
FIG. 7 is a plan view showing the electrode structure of the third embodiment of the liquid crystal display device in accordance with the present invention.

FIG. 6 is a cross-sectional view of a pixel portion illustrating the structure of the third embodiment of a liquid crystal display device in accordance with the present invention. FIG. 7 is a plan view showing the electrode structure of the third embodiment of the liquid crystal display device in accordance with the present invention.

As shown in FIG. 6 and FIG. 7, the third embodiment of the liquid crystal display device 250 is composed of a pair of transparent glass substrates 201, 215; liquid crystal 210 interposed between the substrates 201, 215; a common electrode 202 and pixel electrode 205 formed on the substrate 201 so as to apply a voltage between them to generate an electric field having a component parallel to the substrate surface, as schematically shown by the reference character 226 in FIG. 6; a signal electrode 206 and an active element of a thin film transistor (TFT) 217 formed in the substrate 101; alignment layers 209, 211 of the liquid crystal formed on the surfaces in contact with the liquid crystal 210 of the substrates 201, 215; and a polarizing plate 216 of an optical means for changing the optical characteristic corresponding to an alignment state of the liquid crystal.

In the third embodiment of the liquid crystal display device 250, at least one of the pixel electrode 205 and the common electrode 202 are formed of a transparent conductive film, and a storage capacitance is formed by overlapping at least parts of the pixel electrode and the common electrode though insulation films 204, 207 with each other at an opening portion of the pixel. An electric field 226 is generated between the common electrode 202 and the pixel electrode 205 by action of the thin film transistor 217 to induce switching motion of the liquid crystal molecules of the liquid crystal 210 within a plane nearly parallel to the substrate 201 so as to intersect with the electric field 226 at a right angle, and thereby perform image display.

In most cases of the second and the third embodiments of the present invention, the interval L between the pixel electrode and the common electrodes for applying the electric field to the liquid crystal layer is smaller than the thickness D of the liquid crystal layer within the display region (2D/L>1). Even in the second and the third embodiments, the relative distribution of the electric field intensity in the thickness direction of the liquid crystal layer is nearly equal to that in FIG. 12. Therefore, in the case where the interval L between the electrodes is smaller than two times the thickness D of the liquid crystal layer within the display region (2D/L>1), the electric field intensity in the liquid crystal layer shows a strong asymmetry with respect to the thickness direction of the liquid crystal layer, and, accordingly, a large electric field concentration occurs in the vicinity of the alignment layer on the side of the substrate on which the electrodes are formed. Further, a large electric field concentration is apt to occur in the region near the electrode edge portion of each of the pixel electrode and the common electrode. In such a case, in addition to the adsorption of ionic components in the liquid crystal previously described, the elastic deformation of the interface of the liquid crystal layer described above is increased, and, accordingly, a substantial after image is apt to occur.

In the second embodiment of the present invention, a correlation between the film thickness T of the protective insulation films 107, 108 interposed between the pixel electrode 105 and the alignment layer 109 was studied. As the result, it was found that the level of the after image was effectively decreased as the film thickness T of the protective insulation films 107, 108 was increased. Particularly, it was found that in the case where the film thickness T was larger than the interval L between the pixel electrode 105 and the common electrode 102, the effect of decreasing the after image was large. Further, not only is the film thickness T of the protective insulation films interposed between the pixel electrode 105 and the alignment layer 109 simply increased, but the film thickness of the protective insulation film in the vicinity of the electrode edge can be increased above a target film thickness by flattening or tapering the level difference in the vicinity of the electrode edge using a film forming method, such as a film applying method. Therefore, the electric field concentration in the vicinity of the electrode edge can be effectively modulated. At that time, it is more effective when the level difference on the surface of the alignment layer in contact with the liquid crystal in the uppermost portion of the electrode is flattened below 50 nm.

Furthermore, it was found that the level of the after image was reduced by increasing the film thickness of the insulation film 104 between the pixel electrode 105 and the common electrode 102. That is, an increase of the film thickness of the insulation film between the electrodes is effective. The reason for this is that an increase of the film thickness T of the insulation film between the electrodes corresponds to an increase of the interval L between the electrodes and is equivalent to decreasing the value 2D/L in FIGS. 12(*a*) and 12(*b*). Decreasing of the value 2D/L is equivalent to relatively increasing the electric field intensity on the side of the substrate opposite to the substrate having the electrodes formed thereon, and the position dm where the liquid crystal molecules are most rotated in the liquid crystal layer is effectively increased to be spaced further from the vicinity of the electrode, and, accordingly, the after image can be reduced.

In the third embodiment of the present invention, a correlation between the film thickness of the protective insulation film 208 interposed between the pixel electrode 205 and the alignment layer 209 was studied. As a result, it was found that, similar to the second embodiment, the level of the after image was effectively decreased as the film thickness of the protective insulation films 208 was increased. Further, it was found that the level of the after image was reduced by increasing the film thickness of the insulation films 207, 204 between the pixel electrode 205 and the common electrode 202. That is, an increase of the film thickness of the insulation film between the electrodes is effective, similar to the case of the second embodiment.

Herein, the material of the transparent conductive film composing at least one of the pixel electrode and the common electrode is not particularly limited, but from the viewpoint of easiness of processing and high reliability and so on, it is preferable to employ a transparent conductive film made of an ion-doped titanium oxide, such as indium-tin oxide (ITO) or an ion-doped zinc oxide.

Further, the material of the insulation film interposed in the overlapping portion is not particularly limited, but usable materials are silicon nitride, titanium oxide, silicon oxide and a mixture of these materials which have high reliability. In addition to the inorganic insulation film made of these materials, insulation films made of organic materials, for example, organic polymer materials, may be laminated to form a capacitance. At that time, it is preferable to use an acrylic group or an epoxyacrylate group organic polymer material which has a good insulation property and a good transparency.

EMBODIED EXAMPLES

Embodied Example 1

Figure 8:
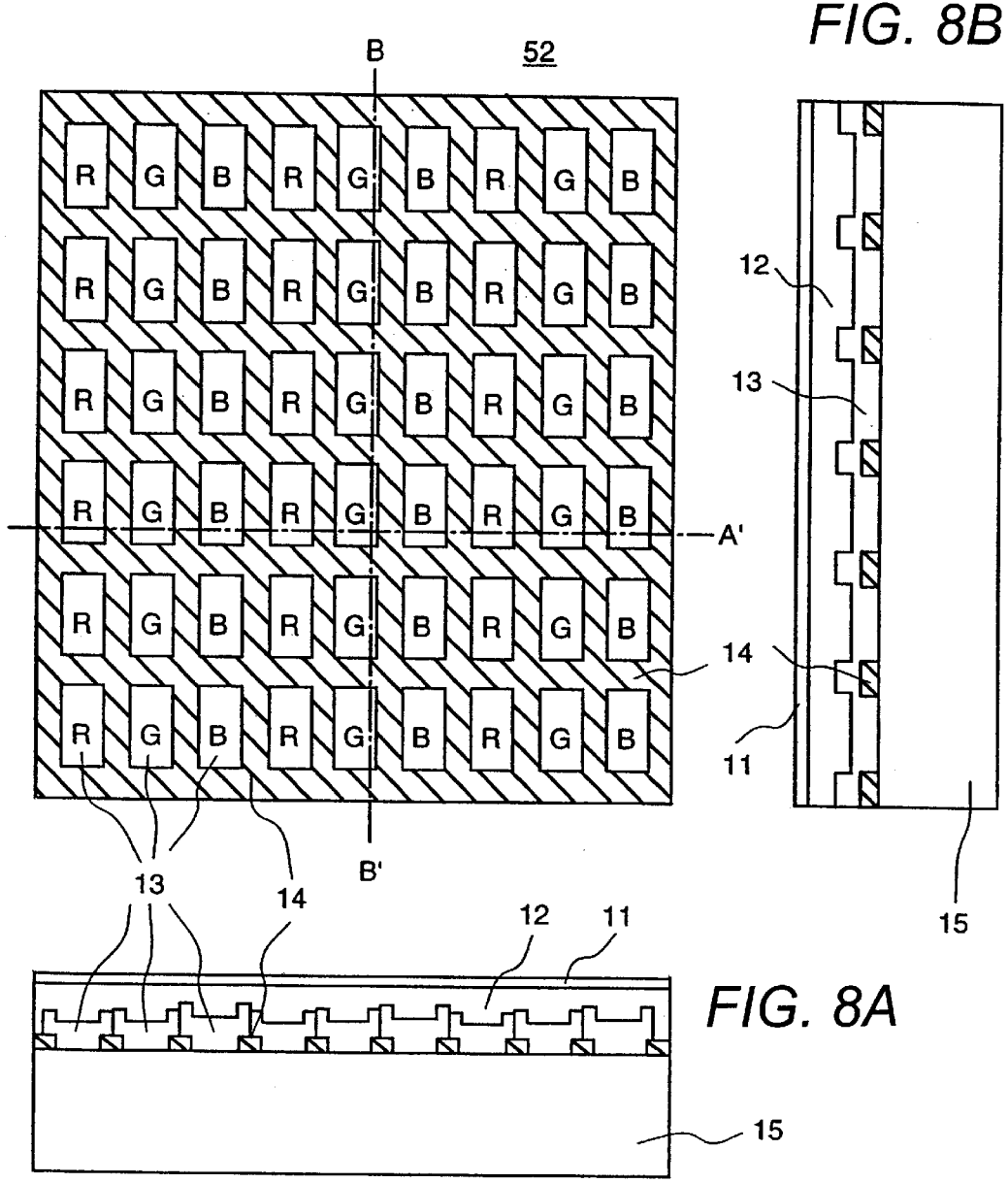
FIG. 8 is a diagrammatic plan view illustrating the structure of a color filter substrate which forms a first example of the liquid crystal display device in accordance with the present invention.

The first embodied example of the present invention, which represents a specific example of the construction of the liquid crystal display device in accordance with the present invention, will be described with reference to FIG. 1 and FIG. 2, and with further reference to FIG. 8 and FIG. 9 to be explained later.

In manufacturing the first embodied example of the liquid crystal display device 50 in accordance with the present invention, a glass substrate with its surface polished to a thickness of 0.7 mm was used as the substrate 1. The insulation film 4, for preventing the electrodes 2, 5, 6, 18 from short circuiting, and the protective insulation film 7, for protecting the thin film transistor 17 and the electrodes 5, 6, were formed on the substrate 1 to provide a TFT substrate 51.

FIGS. 2, 2A and 2B show the construction of the thin film transistor 17 and the electrodes 2, 5, 6; wherein, FIG. 2 is a plan view, FIG. 2A is a cross-sectional view taken on the plane of the line A–A' in FIG. 2, and FIG. 2B is a cross-sectional view taken on the plane of the line B–B' in FIG. 2. FIG. 1 is a cross-sectional view taken on the plane of the line C–C' of FIG. 2.

The thin film transistor 17 was composed of the pixel electrode 5, a signal electrode 6, a scanning electrode 18 and an amorphous silicon film 19. The common electrode 2 and the scanning electrode 18 are aluminum films, and the signal electrode 6 and the pixel electrode 5 were formed by patterning chromium films, and the interval L between the pixel electrode 5 and the common electrode 2 was set to 7 $\mu$m.

Although chromium films, which are low in resistance and easy to pattern, are used for the common electrode 2 and the pixel electrode 5, a higher brightness characteristic may be attained by using ITO films to form the transparent electrodes.

The insulation film 4 and the protective insulation film 7 were made of silicon nitride, and the values of their film thickness were set to 0.2 $\mu$m and 0.3 $\mu$m, respectively. The protective insulation film 8 formed on the protective insulation film 7 was made of an acrylic group organic polymer, and the thickness was set to 0.3 $\mu$m. A capacitance element was formed in the structure interposing the insulation film 4 between the pixel electrode 5 and the common electrode 2 in the junction region between the two pixel electrodes 5. The pixel electrode 5 was arranged to lie in spaces between the three common electrodes 2, as seen in FIG. 2. The number of pixels was 1024×3×768, which is composed of 1024×3 (corresponding to R, G, B) signal electrodes 6 and 768 scanning electrodes 18.

Next, in order to fabricate the alignment layer, polyamic acid varnish having a weight average molecular weight of approximately 50,000 on a standard polystyrene basis was obtained by dissolving 1.0 mole % of p-phenylene diamine into N-methyl-2-pyrrolidone, and further adding 1 mole % of 3,3',4,4'-biphenyl-tetracarboxylic acid anhydride to cause a reaction at 20° C. for 12 hours. The closed compact polyimide alignment layer 9 having a film thickness of about 80 nm was formed by diluting this varnish to 6% concentration, and adding 0.3 weight % on a solid component basis of γ-aminopropyl-triethoxy-silane, and then performing printing on the TFT substrate 51 and heat treatment of 220° C./30 minutes. Unevenness on the surface of the alignment layer formed in such a manner as described above was flattened below about 35 nm, including the level difference at the positions near the pixel electrode and the common electrode.

Next, rubbing treatment was performed on the alignment layer surface with a buff cloth attached to a rubbing roller to add the liquid crystal alignment power to the alignment layer.

A color filter 13 with a black matrix was formed on the other substrate 15 to form the counter color filter substrate 52. FIGS. 8, 8A and 8B are views illustrating the structure of a color filter substrate composing the first embodied example of the liquid crystal display device in accordance with the present invention. FIG. 8 is a plan view of the color filter substrate, FIG. 8A is a cross-sectional view taken on the plane of the line A–A' of FIG. 8, and FIG. 8B is a cross-sectional view taken on the plane of the line B–B' of FIG. 8. The lattice-shaped black matrix 14, the color filter 13 composed of the three colors of R, G, B and the color filter protective film 12 are formed. An alignment layer 11 having a film thickness of about 80 nm similar to that on the TFT substrate 15 was formed on the color filter protective film 12, and rubbing treatment was performed to add the liquid crystal alignment power to the film.

Although the present embodiment uses rubbing as a method of adding the alignment power, it is possible to use other methods. For example, it is possible to use a method in which the alignment layer is formed by applying a UV-curable polymer solution on a substrate, and then liquid crystal alignment power is added to the alignment layer by irradiating linearly polarized UV light onto the alignment layer to cause photochemical reaction; and it is also possible to use a method in which a well-aligned multilayer film is formed by scooping up an organic molecular film spread on a water surface onto the substrate to form the alignment layer.

Particularly, it has been considered that the latter two methods are alignment control methods in which it is difficult to add a sufficiently large tilt angle. However, the interface tilt angle is not necessary in the IPS mode in principle, which is different from the vertical electric field mode typical of the TN mode. Therefore, the mass-productivity and the practicality can be improved by combining the above-described latter method with the IPS mode.

Next, the two substrates were arranged in parallel with the surfaces having the liquid crystal alignment power facing each other, and spacers of spherical polymer beads were dispsersively interposed between them, after which a seal agent was applied to the peripheral portions to assemble the cell. The rubbing directions of the two substrates were nearly parallel to each other, and the angle between the rubbing direction and the applied electric field direction 26 was set to 75° C. The cell was filled with a nematic liquid crystal composition A by injecting it into the cell under a vacuum condition, and the panel was sealed with a sealant of a UV-curable resin. The nematic liquid crystal composition A had an anisotropy of dielectric constant Δ∈ of positive 10.2 (1 kHz, 20° C.), an anisotropy of birefringence An of 0.075 (wavelength 590 nm, 20° C.), a twist elastic constant 2K of 7.0 pN, and a nematic-isotropic phase transition temperature T(N-I) of about 76° C. The liquid crystal panel having a liquid crystal layer with a thickness (gap) of 4.2 $\mu$m was fabricated. The retardation (Δnd) of the panel was about 0.3 $\mu$m. A homogeneous alignment cell was fabricated using an alignment layer and a liquid crystal composition equivalent to those used in the panel, and the pretilt angle was measured though the crystal rotation method, with the measured result being about 2 degrees. The panel was placed between two polarizing plates 16, and the two polarizing plates 16 were arranged so that the polarized light passing axis of one of the polarizing plates might be nearly parallel to the rubbing direction described above, and the polarized light passing axis of the other might be nearly orthogonal to the rubbing direction. After that, a drive circuit and a back light were connected to form a module, and thus an active matrix liquid crystal display device was obtained. The present embodied example employed a normally-closed characteristic in which a dark display is produced at a low voltage level, and light display is produced at a high voltage level.

Figure 9:
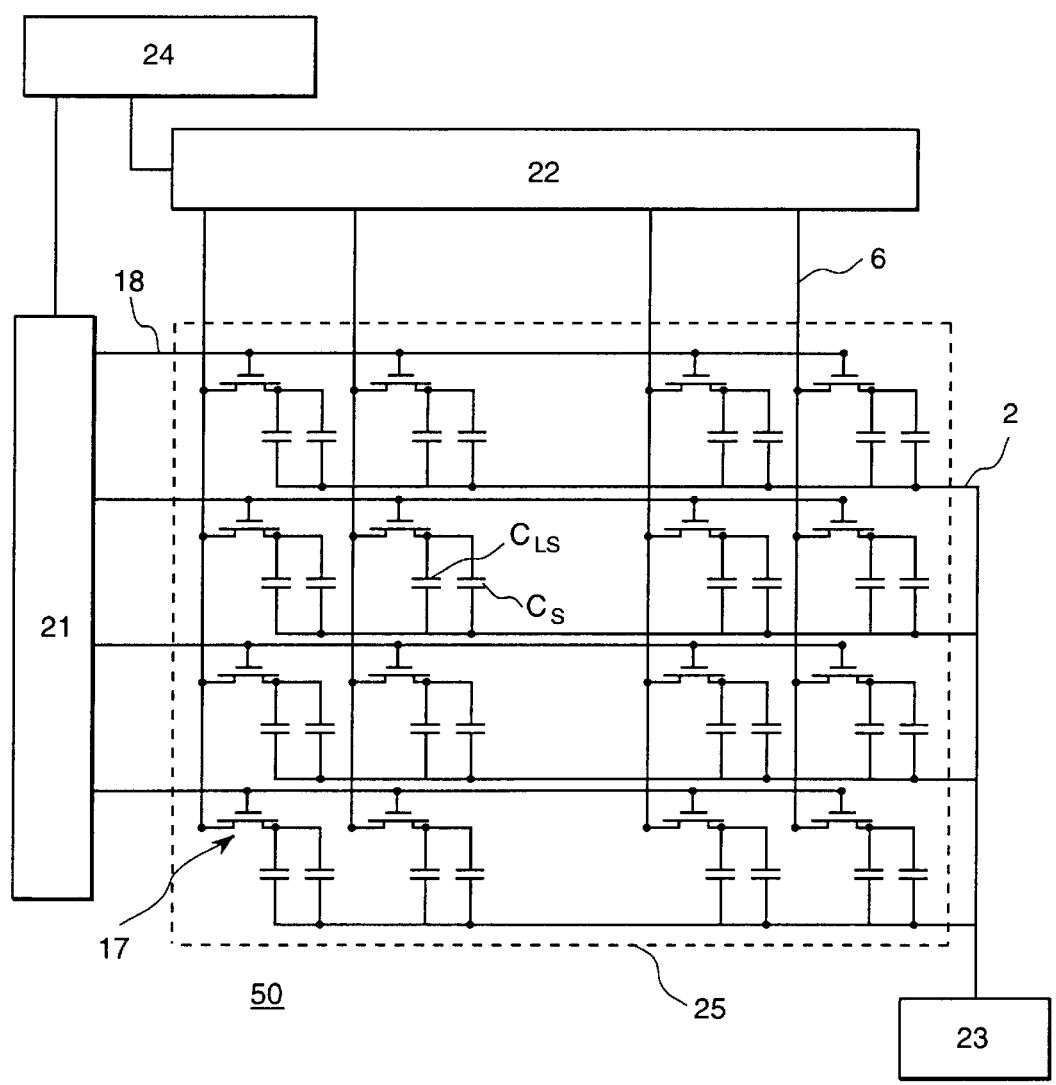
FIG. 9 is a schematic circuit diagram of the structure of a system for driving the first example of the liquid crystal display device in accordance with the present invention.

FIG. 9 is a diagram illustrating the structure of the system for driving the first embodied example of the liquid crystal display device in accordance with the present invention. As shown in FIG. 9, a drive LSI was connected to the liquid crystal display device 50, and a scanning electrode drive circuit 21, a signal electrode drive circuit 22 and a common electrode drive circuit 23 were connected to the TFT substrate 51 to perform active matrix drive by supplying scanning signal voltages, image signal voltages and timing signals from a power source circuit and a control circuit 24. In FIG. 9, the feature of connection of the liquid crystal (CLC) and the capacitance element (CS) as the load of the thin film transistor 17 is shown for each pixel.

From evaluation of the display quality of the first embodied example of the liquid crystal display device in accordance with the present invention, it was determined that a wide viewing angle in the gray level display could be obtained.

Further, in order to quantitatively measure the sticking image and the after image of the first embodied example of the liquid crystal display device in accordance with the present invention, an evaluation was performed using an oscilloscope combining with photo-diodes. Initially, a pattern of windows was displayed with a maximum brightness on the screen for 30 minutes, and after that the whole screen was switched to a gray level display in which the after image was most conspicuous, in this case, so that the brightness might become 10% of the maximum brightness. The time until the pattern of the edge portion of the window disappeared was evaluated as the after image time, and the magnitude of the brightness variance ΔB/B (10%) of the brightness in the after image portion of the window and the brightness B in the peripheral gray level portion was evaluated as the after image intensity.

However, the allowable after image intensity here is smaller than 3%.

The results were that the after image intensity ΔB/B (10%) of brightness variance was about 1%, and in a visual image quality inspection, no unevenness of display due to the sticking image or the after image was observed, and thus a high display characteristic was obtained. By using the alignment layer described above, a liquid crystal display device characterized by a reduced display defect in the form of a sticking image and an after image could be obtained.

Further, the alignment layers 9, 11 in the TFT substrate side and the color filter side of the liquid crystal display device were individually ground, and the two kinds of ground powder were formed into micro pellets using KBr, and then TF-IR absorption spectrum measurement for the micro pellets was performed. After that, imidization treatment of the samples were performed by curing the samples under the condition of 300° C. for 1 hour, and then a similar measurement was performed. Therein, the relative imidization ratio was calculated using the following equation. By using the ratio $R=I(C=C)/I(C-N)$ of the dilatational oscillation peak intensity I(C-N) of imide bonding near 1380 $cm^{-1}$ on an infrared absorption spectrum to the dilatational oscillation peak intensity I(C=C) of a benzene ring skeleton near 1500 $cm^{-1}$ on an infrared absorption spectrum, the above ratio $R_0=I_o(C=C)/I_0(C-N)$ for the imidized sample obtained by performing curing under the condition of 300° C. for 1 hour that polyamic acid is estimated to be nearly completely imidization-reacted is set to 100, and thus the following relative value is defined as the relative imidization ratio. That is, the relative imidization ratio $(\%)=(R/R_0)\times100=\{I(C=C)/I(C-N)\}/\{I_0(C=C)/I_0(C-N)\}\times100$. The result showed that the relative imidization ratios for both of the alignment layers 9, 11 in the TFT substrate side and the color filter side were about 70%.

Further, in order to evaluate the glass transition temperature Tg of the liquid crystal/alignment layer interface of the liquid crystal display element, the temperature dependence of the brightness variance ΔB/B (10%) (after image intensity) was measured using a hot stage. As a result, the brightness variance ΔB/B (10%) showed a constant value below about 3% within the range from room temperature to about 73° C., which is close to the nematic-isotropic phase transition temperature T(N-I) of the liquid crystal composition A used in the liquid crystal display device. Furthermore, the temperature dependence of the glass transition temperature Tg of the liquid crystal/alignment layer interface using another liquid crystal display element was measured. The liquid crystal display element was fabricated using a liquid crystal composition B having a twist elastic constant and an anisotropy of dielectric constant Δ∈ nearly equal to those of the liquid crystal composition A, and a higher nematic-isotropic phase transition temperature T(N-I) of 115° C., but using the others such as the liquid cell forming process and materials which were completely the same as those of the liquid crystal display element described above. The measured result indicated that the brightness variance ΔB/B (10%) was gradually increased near a point exceeding about 100° C., and reached about 10% at 110° C. From the above result, it was found that the Tg of the interface of the liquid crystal display element used in this embodiment was estimated to be about 100° C. and, accordingly, is higher than the T(N-I) point of 76° C. of the liquid crystal composition A used.

Embodied Example 2

Except for the alignment layer used, a liquid crystal display device was formed using the same materials and the same processes as the embodied example 1. In order to fabricate the alignment layer, polyamic acid varnish having a weight average molecular weight of approximately 20,000 on a standard polystyrene basis was obtained by dissolving 1.0 mole % of m-phenylene diamine into N-methyl-2-pyrrolidone, and further adding 1 mole % of 3,3',4,4'-biphenyl-tetracarboxylic acid anhydride to cause a reaction at 40° C. for 6 hours. The closed compact polyimide alignment layer having a film thickness of about 60 nm was formed by diluting this varnish to 6% concentration, and adding 0.3 weight % on the solid component basis of γ-aminopropyl-triethoxy-silane, and then performing printing on the TFT substrate 51 and heat treatment at 225° C./30 minutes.

Further, the surface elastic modulus of a polyimide alignment layer obtained through a similar method to that described above was evaluated using a scanning viscoelasticity microscopy (hereinafter, referred to as SVM) apparatus. Here, the principle of the measurement of surface elastic modulus will be described briefly below. The SVM apparatus is an application of the recently well-known atomic force microscopy (hereinafter, referred to as AFM) apparatus. In a region in which a repulsive force acting between a probe of the AFM and a surface of a sample, that is, under a condition in which the probe adds a deformation on the surface of the sample, a sinusoidal oscillation (strain) is forcibly added to the sample using a piezo-element, and a response oscillation (stress) having the same cycle is detected from the probe. A dynamic viscoelastic function of the sample surface is evaluated from the amplitudes and the phase difference of the stress and the strain signals (the details are described in K. Tanaka et al., Koubunshi Ronbunshuu, Vol. 53 (No. 10), 1996, p582).

Using the apparatus, a surface elastic modulus in 10 MHz of the polyimide alignment layer described above was measured, and the measured result showed that the surface elastic modulus was about 3 GPa.

Further, similar to the embodiment 1, in order to quantitatively measure the sticking image and the after image of the liquid crystal display device fabricated as described above, an evaluation was performed using an oscilloscope combining with photo-diodes. Initially, a pattern of windows was displayed in the maximum brightness on the screen for 30 minutes, and, after that, the whole screen was switched to a gray level display in which the after image was most conspicuous, in this case, so that the brightness might become 10% of the maximum brightness. The time until the pattern of the edge portion of the window disappeared was evaluated as the after image time, and the magnitude of brightness variance ΔB/B (10%) of the brightness in the after image portion of the window and the brightness B in the peripheral gray level portion was evaluated as the after image intensity. However, the allowable after image intensity here is smaller than 3%.

The results were such that the after image intensity ΔB/B (10%) of the brightness variance was about 2%, and in a visual image quality inspection, no unevenness of display due to the sticking image or the after image was observed, and thus a high display characteristic was obtained. By using the alignment layer described above, a liquid crystal display device capable of reducing the display defect of the sticking image and the after image could be obtained.

Further, a relative imidization ratio of the alignment layer and a Tg of the interface between the liquid crystal and the alignment layer were evaluated by a method similar to the case of Embodied example 1, and the result showed that the relative imidization ratios for both of the alignment layers in the TFT substrate side and the color filter side were about 72%, and that the Tg of the interface of the liquid crystal display element used in this embodiment was estimated to be about 95° C., and, accordingly, is higher than the T(N-I) point of 76° C. of the liquid crystal composition A used.

Embodied Example 3

A liquid crystal display device was formed using the same materials and the same processes as the embodied example 1 except for the alignment layer. In order to fabricate the alignment layer, polyamic acid methyl ester varnish having a weight average molecular weight of approximately 12,000 to 150,000 on a standard polystyrene basis was obtained by dissolving 1.0 mole % of 4,4'-diaminodiphenyle methane into a mixed solvent of N-methyl-2-pyrrolidone and dimethyl acetaminde, and further adding 1 mole % of 1,2,3,4-cyclopentane carboxylic acid anhydride to cause a reaction at 30° C. for 12 hours, and then performing methyl esterification treatment. After that, by separating and collecting the varnish using a gel permeation chromatograpy, simple fraction polyamic acid varnish having a weight average molecular weight of about 80,000 and a weight average molecular weight/number average molecular weight (MW/MN) of 1.51 was obtained. The closed compact polyimide alignment layer having a film thickness of about 60 nm was formed by diluting this varnish to 6% concentration, and adding 0.3 weight % on the solid component basis of γ-aminopropyl-triethoxy-silane, and then performing printing on the TFT substrate 51 and heat treatment of 220° C./30 minutes. Unevenness on the surface of the alignment layer formed by such a manner as described above was flattened below about 40 nm, including the level difference at the positions near the pixel electrode and the common electrode. Further, a homogeneous alignment cell was fabricated using an alignment layer and a liquid crystal composition equivalent to those used in the panel, and the pretilt angle was measured though the crystal rotation method, and the measured result was about 3 degrees.

The relative imidization ratio of the alignment layer was measured by a method similar to the case of Embodied example 1, and the result showed that the relative imidization ratios for both of the alignment layers in the TFT substrate side and the color filter side were about 75%. Further, similar to the embodiment 1, in order to quantitatively measure the sticking image and the after image of the liquid crystal display device fabricated as described above, evaluation was performed using an oscilloscope combining with photo-diodes. Initially, a pattern of windows was displayed at the maximum brightness on the screen for 30 minutes, and after that the whole screen was switched to a gray level display in which the after image was most conspicuous, in this case, so that the brightness might become 10% of the maximum brightness. The time until the pattern of the edge portion of the window disappeared was evaluated as the after image time, and the magnitude of brightness variance ΔB/B (10%) of the brightness in the after image portion of the window and the brightness B in the peripheral gray level portion was evaluated as the after image intensity. However, the allowable after image intensity here is smaller than 3%.

The results indicated that the after image intensity ΔB/B (10%) of brightness variance was about 2%, and in a visual image quality inspection, no unevenness of display due to the sticking image or the after image was observed, and thus a high display characteristic was obtained. By using the alignment layer described above, a liquid crystal display device having a reduced display defect in the form of a sticking image and an after image could be obtained.

Further, a relative imidization ratio of the alignment layer was evaluated by a method similar to the case of Embodied example 1, and the result showed that the relative imidization ratios for both of the alignment layers in the TFT substrate side and the color filter side were about 65%.

Further, a glass transition temperature Tg of the polyimide alignment layer was evaluated using a scanning thermal microscope. The scanning thermal microscope is an apparatus for performing micro differential thermal analysis of a surface in which a micro-thermocouple is used instead of the probe in the atomic force microscopy apparatus. As result of the evaluation, it was found that the apparatus the Tg of the interface of the alignment layer was about 225° C.

Embodied Example 4

The fourth embodied example of the present invention, which is a specific example of the construction of the liquid crystal display device in accordance with the present invention, will be described with reference to FIG. 3, FIG. 4, and FIG. 4B.

In manufacturing the fourth embodied example of the liquid crystal display device 150 in accordance with the present invention, a glass substrate having its surface polished to a thickness of 0.7 mm was used as the substrate 101. The insulation film 104 for preventing the electrodes 102, 105, 106, 118 from short circuiting, and the protective insulation film 107 for protecting the thin film transistor 117 and the electrodes 105, 106 were formed on the substrate 101 to provide a TFT substrate 151.

FIGS. 4, 4A and 4B show the construction of the thin film transistor 117 and the electrodes 102, 105, 106; wherein, and FIG. 4 is a plan view, FIG. 4A is a cross-sectional view taken on the plane of the line A–A' in FIG. 4, and FIG. 4B is a cross-sectional view taken on the plane of the line B–B' in FIG. 4. FIG. 3 is a cross-sectional view taken on the plane of the line C–C' of FIG. 4.

The thin film transistor 117 was composed of the pixel electrode 105, a signal electrode 106, a scanning electrode 118 and an amorphous silicon film 119. The scanning electrode 118 was formed by patterning an aluminum film, the signal electrode 106 was formed by patterning a chromium film, and the common electrode 102 and the pixel electrode 105 were formed by patterning ITO.

The insulation film 104 and the protective insulation film 107 were made of silicon nitride, and the values of their film thickness were set to 0.5 μm and 0.3 μm, respectively. The protective insulation film 108 formed on the protective insulation film 107 was made of an acrylic group organic polymer, and the thickness thereof was set to 0.2 μm to flatten the unevenness of the surface due to the level difference of the common electrode 102 and the pixel electrode 105 in the display region. A capacitance element 120 was formed in a structure interposing the insulation film 104 between the pixel electrode 105 and the common electrode 102 in the junction region between the two pixel electrodes 105 and the opening region. The pixel electrode 105 was arranged to lie in the spaces between the three common electrodes 102, as seen in FIG. 4. Although the number of common electrodes in this embodied example is three, it is possible to increase the number of the interdigital portion between the pixel electrodes by narrowing the interval of the interdigital portions, and to correspondingly increase the number of the common electrodes. The number of pixels was 1024×3×768, which was composed of 1024×3 (corresponding to R, G, B) signal electrodes 106 and 768 scanning electrodes 118.

Next, the polyimide alignment layer 109 having a film thickness of about 80 nm similar to that of the embodied example 1 was formed on the TFT substrate 151, and the unevenness of the surface of the level difference became about 48 nm by substantially flattening the level difference of about 150 nm due to the electrodes. Further, rubbing treatment for aligning the liquid crystal was performed on the flattened surface to add the liquid crystal alignment power to the alignment layer.

A color filter 113 with a black matrix 114 of the same structure as that in the first embodied example of the liquid crystal display device 50 in accordance with the present invention was formed on the substrate 115 to form the counter color filter substrate 152. An alignment layer 111 having a film thickness of about 80 nm similar to that on the TFT substrate 115 was formed on the color filter protective film 112, and rubbing treatment was performed to add the liquid crystal alignment power to the film.

The rubbing directions of the substrates 109, 111 in the TFT substrate 151 and the color filter substrate 152 were nearly parallel to each other, and the angle between the rubbing direction and the applied electric field direction 126 was set to 75 degrees. Next, polymer beads having an average grain size of 4 μm were dispersed between the substrates as spacers, and the liquid crystal 110 was interposed between the TFT substrate 151 and the color filter substrate 152.

As the liquid crystal 110, the liquid crystal composition A similar to that used in the embodied example 1 was used. The average dielectric constant $\in_{LC}$ of the liquid crystal composition A was about 10.

The two polarizing plates 116 sandwiching the TFT substrate 151 and the color filter substrate 152 were arranged in cross-nicol. The fourth embodied example of the liquid crystal display device 150 employed a normally-closed characteristic in which a dark display is produced at a low voltage level, and a light display is produced at a high voltage level.

Since the construction of the system for driving the fourth embodied example of the liquid crystal display device is similar to the construction of the first embodied example, the details of the construction will be omitted here.

From evaluation of display quality of the fourth embodied example of the liquid crystal display device in accordance with the present invention, it was determined that a wide viewing angle in the gray level display could be obtained.

Further, in order to quantitatively measure the sticking image and the after image of the liquid crystal display device fabricated as described above, evaluation was performed using an oscilloscope combining with photo-diodes. Initially, a pattern of windows was displayed at the maximum brightness on the screen for 30 minutes, and after that the whole screen was switched to a gray level display in which the after image was most conspicuous, in this case, so that the brightness might become 10% of the maximum brightness. The time until the pattern of the edge portion of the window disappeared was evaluated as the after image time, and the magnitude of brightness variance ΔB/B (10%) of the brightness in the after image portion of the window and the brightness B in the peripheral gray level portion was evaluated as the after image intensity. However, the allowable after image intensity here is smaller than 3%.

The results indicated that the after image intensity ΔB/B (10%) of brightness variance was about 2%, and in a visual image quality inspection, no unevenness of display due to the sticking image or the after image was observed, and thus a high display characteristic was obtained. By using the alignment layer described above, the liquid crystal display device capable of reducing the display defect of the sticking image and the after image could be obtained.

Further, a relative imidization ratio of the alignment layer and a Tg of the interface between the liquid crystal and the alignment layer were evaluated by a method similar to the case of Embodied example 1, and the results showed that the relative imidization ratios for both of the alignment layers in the TFT substrate side and the color filter side were about 76%, and that the Tg of the interface of the alignment layer was about 90° C. which was higher than the T(N-I)=76° C. of the liquid crystal composition A used. Further, a glass transition temperature Tg of the polyimide alignment layer was evaluated using a scanning thermal microscope, similar to the method in Embodied example 3, and a value of about 230° C. was obtained.

Embodied Example 5

Figure 5:
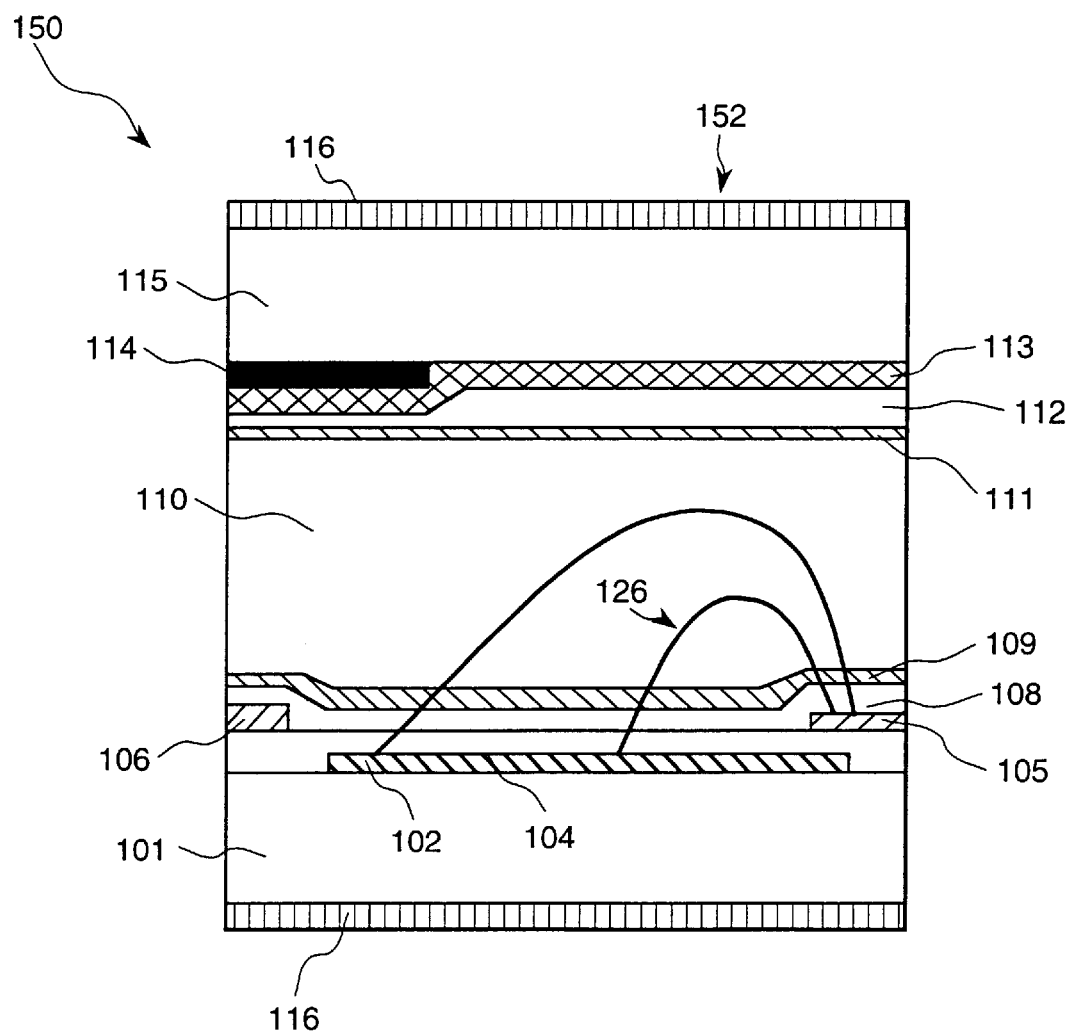
FIG. 5 is a cross-sectional view of a pixel portion illustrating the structure of a modification of the second embodiment of the liquid crystal display device in accordance with the present invention.

As shown in FIG. 5, the fifth embodied example of the liquid crystal display device in accordance with the present invention is constructed to have a structure such that the protective insulation film formed just above the pixel electrode 105 is composed of one layer 108, and the protective insulation film 107 made of silicon nitride does not exist in the display region, and the other structural features are nearly similar to those of the fourth embodied example.

The protective insulation film 108 formed on the pixel electrode 105 was made of an epoxy-acrylate group organic polymer, and the thickness was set to 0.3 μm to flatten the unevenness of the surface due to the level difference of the common electrode 102 and the pixel electrode 105 in the display region.

Next, the closed compact polyimide alignment layer 109 having a film thickness of about 80 nm similar to that of the embodied example 1 was formed on the TFT substrate 151, and the unevenness on the surface of the level difference became about 30 nm by substantially flattening the level difference of about 150 nm due to the electrodes. Further, rubbing treatment for aligning the liquid crystal was performed on the flattened surface to add the liquid crystal alignment power to the alignment layer. The details on the other features are omitted here.

From evaluation of the display quality of the fifth embodied example of the liquid crystal display device in accordance with the present invention, it was determined that a wide viewing angle in the gray level display could be obtained.

Further, in order to quantitatively measure the sticking image and the after image of the liquid crystal display device fabricated as described above, an evaluation was performed using an oscilloscope combining with photo-diodes. Initially, a pattern of windows was displayed at the maximum brightness on the screen for 30 minutes, and after that the whole screen was switched to a gray level display in which the after image was most conspicuous, in this case, so that the brightness might become 10% of the maximum brightness. The time until the pattern of the edge portion of the window disappeared was evaluated as the after image time, and the magnitude of brightness variance $\Delta B/B$ (10%) of the brightness in the after image portion of the window and the brightness B in the peripheral gray level portion was evaluated as the after image intensity. However, the allowable after image intensity here is smaller than 3%.

The result indicated that the after image intensity $\Delta B/B$ (10%) of the brightness variance was about 2.5%, and in a visual image quality inspection, no unevenness of display due to the sticking image or the after image was observed, and thus a high display characteristic was obtained. By using the alignment layer described above, a liquid crystal display device having a reduced display defect in the form of a sticking image and an after image could be obtained.

Embodied Example 6

The sixth embodied example of the liquid crystal display device in accordance with the present invention has a different liquid crystal and alignment layer than that used in the fourth embodied example. Further, the protective insulation film 108 was made of an epoxy-acrylate group organic polymer, and the thickness was set to 0.4 µm to flatten the unevenness of the surface due to the level difference of the electrodes. The other features were similar to those of the fourth embodied example. Therefore, the details of the construction are omitted here.

The liquid crystal composing the sixth embodied example of the liquid crystal display device was liquid crystal composition B which had a cyano-structure in the molecule, and a negative anisotropy of dielectric constant of −2.2, and an anisotropy of birefringence $\Delta n$ of 0.1. The average dielectric constant $\in_{LC}$ of the liquid crystal composition B was about 4.5. Polyamic acid methyl ester as used in the third embodied example was used for the alignment layer, and a closed compact polyimide alignment layer having a film thickness of about 60 nm was formed performing printing and heat treatment of 230° C./30 minutes. An uneven level difference on the surface of the alignment layer was flattened to about 40 nm even in the positions near the electrodes. Therefore, the rubbing directions of the alignment layers in the TFT substrate side and the color filter substrate side were set to be parallel to each other, but an angle between the rubbing direction and the direction of the applied electric field 126 was set to 15 degrees.

When the liquid crystal composing the sixth embodied example of the liquid crystal display device in accordance with the present invention was driven, the liquid crystal display device was driven on the higher voltage side compared to the fifth embodied example of the liquid crystal display device. Further, from evaluation of the display quality of the sixth embodied example of the liquid crystal display device, it was determined that a wide viewing angle in the gray level display could be obtained.

The relative imidization ratio of the alignment layer was evaluated by a method similar to the case of Embodied example 1, and the result showed that the relative imidization ratios for both of the alignment layers in the TFT substrate side and the color filter side were about 78%. Further, in order to quantitatively measure the sticking image and the after image of the liquid crystal display device fabricated as described above, an evaluation was performed using an oscilloscope combining with photo-diodes. Initially, a pattern of windows was displayed at the maximum brightness on the screen for 30 minutes, and after that the whole screen was switched to a gray level display in which the after image was most conspicuous, in this case, so that the brightness might become 10% of the maximum brightness. The time until the pattern of the edge portion of the window disappeared was evaluated as the after image time, and the magnitude of the brightness variance $\Delta B/B$ (10%) of the brightness in the after image portion of the window and the brightness B in the peripheral gray level portion was evaluated as the after image intensity. However, the allowable after image intensity here is smaller than 3%.

The results indicated that the after image intensity $\Delta B/B$ (10%) of brightness variance was about 1.6%, and in a visual image quality inspection, no unevenness of display due to the sticking image or the after image was observed, and thus a high display characteristic was obtained. By using the alignment layer described above, a liquid crystal display device having a reduced display defect in the form of a sticking image and an after image could be obtained.

Embodied Example 7

The seventh embodied example of the present invention, which is a specific example of the construction of the third embodiment of the liquid crystal display device in accordance with the present invention, will be described below with reference to FIG. 6 and FIG. 7.

In manufacturing the seventh embodied example of the liquid crystal display device 250 in accordance with the present invention, a glass substrate having its surface polished to a thickness of 0.7 mm was used as the substrate 201. The insulation film 204 for preventing the electrodes 202, 205, 206, 218 from short circuiting, and the protective insulation film 207 for protecting the thin film transistor 217 and the electrodes 205, 206 were formed on the substrate 201 to provide a TFT substrate 251.

FIG. 7 shows the structure of the thin film transistor 217 and the electrodes 202, 205 and 206. The thin film transistor 217 was composed of the pixel electrode 205, a signal electrode 206, a scanning electrode 218 and an amorphous silicon film 219. The scanning electrode 218 was formed by patterning an aluminum film, the signal electrode 206 was formed by patterning a chromium film, and the common electrode 202 and the pixel electrode 205 were formed by patterning ITO.

The insulation film 204 and the protective insulation film 207 were made of silicon nitride, and the values of their film thickness were set to 0.2 µm and 0.3 µm, respectively. A capacitance element was formed in a structure interposing the insulation films 204, 207 between the pixel electrode 205 and the common electrode 202. Further, the protective insulation film 208 made of an acrylic group organic polymer having a dielectric constant of about 4 was formed to a thickness of 0.3 μm on the pixel electrode 205.

The pixel electrodes 205 were arranged so as to be superimposed on the upper layer of the flat and wide common electrode 202. The number of pixels was 1024× 3×768, which was composed of 1024×3 (corresponding to R, G, B) signal electrodes 206 and 768 scanning electrodes 218.

Next, the polyimide alignment layer 209 having a film thickness of about 80 nm, similar to that of the embodied example 1, was formed on the TFT substrate 251, and rubbing treatment for aligning the liquid crystal was performed on the surface to add liquid crystal alignment power to the alignment layer. As a result, the unevenness on the surface of the level difference became about 20 nm by substantially flattening the level difference of about 150 nm due to the electrodes.

A color filter 213 with a black matrix 214 of the same structure as that in the first embodied example of the liquid crystal display device 50 in accordance with the present invention was formed on the substrate 215 to form the counter color filter substrate 252. An alignment layer 211 having a film thickness of about 80 nm, similar to that on the TFT substrate 215, was formed on the color filter protective film 212, and rubbing treatment was performed to add the liquid crystal alignment power to the film.

The rubbing directions of the substrates 209, 211 in the TFT substrate 251 and the color filter substrate 252 were nearly parallel to each other, and the angle between the rubbing direction and the applied electric field direction 226 was set to 75 degrees. Next, polymer beads having an average grain size of 3 μm were dispersed between the substrates as spacers, and the liquid crystal 210 was interposed between the TFT substrate 251 and the color filter substrate 252.

As the liquid crystal 210, the liquid crystal composition A similar to in the embodied example 1 was used. The average dielectric constant $\in_{LC}$ of the liquid crystal composition A was about 10.

The two polarizing plates 216 sandwiching the TFT substrate 251 and the color filter substrate 252 were arranged in cross-nicol. The fourth embodied example of the liquid crystal display device 250 employed a normally-closed characteristic in which a dark display is produced at a low voltage level, and a light display is produced at a high voltage level.

Since the construction of the system for driving the seventh embodied example of the liquid crystal display device is similar to the construction of the first embodied example, the details of the construction will be omitted here.

From evaluation of the display quality of the seventh embodied example of the liquid crystal display device in accordance with the present invention, it was determined that a wide viewing angle in the gray level display could be obtained. Similar to the Embodied example 1, in order to quantitatively measure the sticking image and the after image of the liquid crystal display device fabricated as described above, an evaluation was performed using an oscilloscope combining with photo-diodes. Initially, a pattern of windows was displayed in the maximum brightness on the screen for 30 minutes, and after that the whole screen was switched to a gray level display in which the after image was most conspicuous, in this case, so that the brightness might become 10% of the maximum brightness. The time until the pattern of the edge portion of the window disappeared was evaluated as the after image time, and the magnitude of the brightness variance ΔB/B (10%) of the brightness in the after image portion of the window and the brightness B in the peripheral gray level portion was evaluated as the after image intensity. However, the allowable after image intensity here is smaller than 3%.

The results indicated that the after image intensity ΔB/B (10%) of the brightness variance was about 2%, and in a visual image quality inspection, no unevenness of display due to a sticking image or an after image was observed, and thus a high display characteristic was obtained. By using the alignment layer described above, a liquid crystal display device having a reduced display defect in the form of a sticking image and an after image could be obtained.

Further, the Tg of the interface between the liquid crystal and the alignment layer was evaluated by a method similar to the case of Embodied example 1, and the result showed that the Tg of the interface was about 105° C. and, accordingly, is higher than the T(N-I) point of 76° C. of the liquid crystal composition A used. Further, similar to Embodied example 2, a surface elastic modulus at 50 MHz of the polyimide alignment layer described above was measured using a scanning viscoelasticity microscopy (SVM) apparatus, and the measured result showed that the surface elastic modulus was about 4 GPa.

Embodied Example 8

Except for the alignment layer used, a liquid crystal display device was formed using the same materials and the same processes as the embodied example 1. A polyamic acid varnish composed of 4,4'-diamino-diphenyl methane as the diamine chemical compound and 1,2,3,4-cyclobutane-tetracarboxylic acid anhydride as the acid anhydride was printed on the surface of the substrate, and it was cured and imidized at 230° C. for 30 minutes to form an alignment layer which had a film thickness of about 50 nm and a surface uneven level difference of 20 nm. After that, photo alignment treatment was performed by irradiating linearly polarized light of 313 nm wavelength onto the surface.

Thus, a good liquid crystal alignment in the vertical direction to the direction of the irradiation linearly polarized light was obtained by annealing at 100° C. for 10 minutes, after sealing the nematic liquid crystal composition A similar to Embodied example 1.

In the manner as described above, a liquid crystal display device having a liquid crystal layer thickness d of 4.0 μm was obtained. Further, a homogeneous alignment cell was fabricated using an alignment layer and a liquid crystal composition equivalent to those used in the panel, and the pretilt angle was measured using the crystal rotation method, and the measured result was about 1 degree.

Further, the Tg of the interface between the liquid crystal and the alignment layer was evaluated by a method similar to the case of Embodied example 1, and the result showed that the Tg of the interface was about 85° C. and, accordingly, is higher than the T(N-I) point of 76° C. of the liquid crystal composition A used. Further, by a method similar to that of Embodied example 1, the sticking image and the after image characteristics of the liquid crystal display device fabricated as described above were quantitatively evaluated using a window pattern. The result indicated that the after image intensity ΔB/B (10%) of brightness variance was about 3%, and in a visual image quality inspection, no unevenness of display due to a sticking image or an after image was observed, and thus a high display characteristic was obtained.

Further, the relative imidization ratio of the alignment layer was evaluated, and the result showed that the relative imidization ratio was about 80%.

Embodied Example 9

The polyamic acid varnish similar to that used in Embodied example 8 was printed on the surface of the substrate, and it was imidized at 220° C. for 30 minutes to form a film. After that, photo alignment treatment was performed by irradiating linearly polarized light of 308 nm wavelength onto the surface using a $XeCl_2$ gas excimer laser.

Thus, a good liquid crystal alignment in the vertical direction to the direction of the irradiation linearly polarized light was obtained by annealing at 100° C. for 10 minutes after sealing the nematic liquid crystal composition A similar to Embodied example 1.

In the manner as described above, a liquid crystal display device having a liquid crystal layer thickness d of 4.0 μm was obtained. Further, a homogeneous alignment cell was fabricated using an alignment layer and a liquid crystal composition equivalent to those used in the panel, and the pretilt angle was measured though the crystal rotation method, and the measured result was about 1 degree.

The Tg of the interface of the alignment layer was evaluated using the same method as in Embodied example 3, and the result showed that the Tg was about 225° C., and, accordingly, is higher than the T(N-I) point of 76° C. of the liquid crystal composition A used. Further, by a method similar to that of Embodied example 1, the sticking image and the after image characteristics of the liquid crystal display device fabricated as described above were quantitatively evaluated using a window pattern. The result indicated that the after image intensity ΔB/B (10%) of brightness variance was about 2%, and in a visual image quality inspection, no unevenness of display due to the sticking image or the after image was observed, and thus a high display characteristic was obtained. Further, the relative imidization ratio of the alignment layer was evaluated, and the result showed that the relative imidization ratio was about 76%.

Comparative Example 1

Except for the alignment layer used, a liquid crystal display device was formed using the same materials and the same processes as the embodied example 1. A polyamic acid varnish composed of 2,2'-bis{4-(p-aminophenoxy)phenyl}hexane as the diamine chemical compound and 3,3'4,4'-benzophenone-tetracarboxylic acid anhydride as the acid anhydride was printed on the surface of the substrate, and heat treated at 200° C. for 30 minutes to form a closely compact polyimide alignment layer having a thickness of about 70 nm. Further, a homogeneous alignment cell was fabricated using an alignment layer and a liquid crystal composition equivalent to those used in the panel, and the pretilt angle was measured though the crystal rotation method, and the measured result was about 7 degrees.

Next, similar to the case of Embodied example 1, the sticking image and the after image characteristics of the liquid crystal display device fabricated as described above were quantitatively measured and evaluated. Initially, a pattern of windows was displayed at the maximum brightness on the screen for 30 minutes, and after that the whole screen was switched to a gray level display in which the after image was most conspicuous, in this case, so that the brightness might become 10% of the maximum brightness. The time until the pattern of the edge portion of the window disappeared was evaluated as the after image time, and the magnitude of brightness variance ΔB/B (10%) of the brightness in the after image portion of the window and the brightness B in the peripheral gray level portion was evaluated as the after image intensity. However, the allowable after image intensity here is smaller than 3%.

The result was that the after image intensity ΔB/B (10%) of brightness variance was as large as about 5%, and it took about 30 minutes until the after image disappeared. Further, in a visual image quality inspection, unevenness of display due to a sticking image or an after image was clearly observed. As described above, when using the alignment layer described above, the display defect due to the presence of a sticking image and an after image was conspicuous.

The relative imidization ratio of the alignment layer was evaluated by a method similar to the case of Embodied example 1, and the result showed that the relative imidization ratios for both of the alignment layers in the TFT substrate side and the color filter side were about 56%. Further, similar to Embodied example 2, a surface elastic modulus at 10 MHz of the polyimide alignment layer described above was measured using a scanning viscoelasticity microscopy (SVM) apparatus, and the measured result showed that the surface elastic modulus was about 0.3 GPa.

Comparative Example 2

After forming the insulation film 104 having a thickness of 0.6 μm using silicon nitride, the pixel electrode 105 was formed by ITO on the insulation film 104, and the protective insulation film 107 having a thickness of 0.2 μm was formed using silicon nitride on the pixel electrode 105, and then the polyamic acid group alignment layer 109 having a thickness of 60 nm was directly formed on the protective insulation film 107 without forming the protective insulation film 108. As a result, the uneven level difference on the surface around the pixel electrode 205 was about 150 nm, and the level difference was almost equal to that of the pixel electrode itself.

A liquid crystal display device was fabricated by fixing the other structures equal to those of Embodied example 4, and the sticking image and the after image characteristics of the liquid crystal display device were quantitatively measured and evaluated. Initially, a pattern of windows was displayed at the maximum brightness on the screen for 30 minutes, and after that the whole screen was switched to a gray level display in which the after image was most conspicuous, in this case, so that the brightness might become 10% of the maximum brightness. The time until the pattern of the edge portion of the window disappeared was evaluated as the after image time, and the magnitude of brightness variance ΔB/B (10%) of the brightness in the after image portion of the window and the brightness B in the peripheral gray level portion was evaluated as the after image intensity. However, the allowable after image intensity here is smaller than 3%.

The result was that the after image intensity ΔB/B (10%) of brightness variance was as large as about 5%, and it took about 30 minutes until the after image disappeared. Further, in a visual image quality inspection, unevenness of display due to a sticking image or an after image was clearly observed.

According to the present invention, it is possible to provide a high-quality liquid crystal display device with less unevenness of display caused by a sticking image and an after image, and which display device is suitable for mass production, the liquid crystal display device being of the IPS mode in which a display is produced by causing rotational movement of liquid crystal molecules nearly within a plane and using the birefringence of the liquid crystal.

What is claimed is:

1. A liquid crystal display device comprising:
    a pair of substrates, at least one of said substrates being transparent;
    a liquid crystal layer interposed between said pair of substrates;
    pixel electrodes and common electrodes and active elements arranged on at least one substrate between said pair of substrates, liquid crystal of said liquid crystal layer being controlled to perform display by applying a voltage between said pixel electrode and said common electrode;
    an alignment layer formed on a surface in contact with said liquid crystal layer of each of said pair of substrates; and
    an insulation film having at least one layer is disposed between said alignment layer in a side of the substrate having said electrodes formed thereon and an electrode which is closer to said alignment layer between said pixel electrode and said common electrode;
    wherein a thickness T of said insulation film interposed between said alignment layer in the side of the substrate having said electrodes formed thereon and the electrode which is closer to said alignment layer between said pixel electrode and said common electrode is larger than a value of one fourth of an interval L between said pixel electrode and said common electrode.

2. A liquid crystal display device comprising:
    a pair of substrates, at least one of said substrates being transparent;
    a liquid crystal layer interposed between said pair of substrates;
    pixel electrodes and common electrodes and active elements arranged on at least one substrate between said pair of substrates, liquid crystal of said liquid crystal layer being controlled to perform display by applying a voltage between said pixel electrode and said common electrode; and
    an insulation film having at least two layers is disposed between said pixel electrode and said common electrode;
    wherein a thickness T of said insulation film which is interposed between an alignment layer in the side of the substrate having said electrodes formed thereon and the electrode which is closer to said alignment layer between said pixel electrode and said common electrode is larger than a value of one fourth of an interval L between said pixel electrode and said common electrode.

3. A liquid crystal display device according to any one of claims 1 and 2, wherein the thickness T of said insulation film is larger than a value of one half of an interval L between said pixel electrode and said common electrode.

4. A liquid crystal display device according to claim 1, wherein a magnitude of dielectric constant $\in_{PAS}$ of said insulation film is smaller than an average dielectric constant $\in_{LC}$ of said liquid crystal layer.

5. A liquid crystal display device according to any one of claims 1 and 2, which is constructed so that an interval L between said pixel electrode and said common electrode within a display region where change of an optical characteristic due to liquid crystal movement contributes to display and a thickness D of said liquid crystal layer within said display region may satisfy the relation L<2D.

6. A liquid crystal display device according to claim 1, wherein level difference on a surface of said alignment layer in contact with the liquid crystal at uppermost portions of said pixel electrode and said common electrode is flattened by at least one of said insulation film and said alignment layer.

7. A liquid crystal display device according to any one of claim 1 and 2, wherein said insulation film is formed in a range covering over all the display region where change of an optical characteristic due to liquid crystal movement contributes to display.

8. A liquid crystal display device according to any one of claims 1 and 2, wherein at least one layer of said insulation film is an inorganic insulation film.

9. A liquid crystal display device according to any one of claims 1 and 2, wherein at least one layer of said insulation film is an organic insulation film.

10. A liquid crystal display device according to any one of claims 1 and 2, wherein said insulation film is composed of two layers of an organic insulation film and an inorganic insulation film.

11. A liquid crystal display device according to claim 10, wherein at least one layer of said insulation film is an inorganic insulation film made of at least one kind of material selected from the group consisting of silicon nitride, silicon oxide and polysiloxane group materials.

12. A liquid crystal display device according to claim 10, wherein said organic insulation film is made of at least one kind of organic polymer selected from the group consisting of polyimide group polymers, acrylic group polymers and epoxy-acrylate group polymers.

13. A liquid crystal display device according to any one of claims 1 and 2, wherein said active element is a thin film transistor.

14. A liquid crystal display device according to any one of claims 1, and 2, wherein at least one of said pixel electrode and said common electrode is formed of a transparent electric conductive film.

15. A liquid crystal display device according to claim 14, wherein said transparent electric conductive film is an ion doped titanium oxide film or an ion doped zinc oxide (ZnO) film.

16. A liquid crystal display device according to any one of claims 1 and 2, wherein alignment control directions of the liquid crystal in the two interfaces between said liquid crystal layer and said pair of substrates are nearly equal to each other.

17. A liquid crystal display device according to any one of claims 1 and 2, wherein said pair of alignment layers individually formed on the surfaces in contact with said liquid crystal layer of said pair of substrates are made of an organic polymer selected from the group consisting of polyamic acid group polymers and polymamide ester group polymers having a relative imidization ratio above 60%.

18. A liquid crystal display device according to any one of claims 1 and 2, said alignment layer is made of an organic polymer selected from the group consisting of polyamic acid group polymers and polymamide ester group polymers having a relative imidization ratio above 70%.

19. A liquid crystal display device according to claim 18, wherein said polyamic acid group organic polymer contains at least one kind of group selected from the group consisting of methyl ester group, ethyl ester group and propyl ester group.

20. A liquid crystal display device according to any one of claims 1 and 2, wherein a surface elastic modulus of said pair of alignment layers formed on the surfaces in contact with said liquid crystal layer of said pair of substrates is larger than 1 GPa.

21. A liquid crystal display device according to any one of claims 1 and 2, wherein a glass transition temperature Tg of interfaces between said pair of alignment layers formed on the surfaces in contact with said liquid crystal layer of said pair of substrates and said liquid crystal layer is higher than a nematic-isotropic phase transition temperature T(N-I) of a liquid crystal composition forming said liquid crystal layer.

22. A liquid crystal display device according to any one of claims 1 and 2, wherein a glass transition temperature Tg of interfaces between said pair of alignment layers formed on the surfaces in contact with said liquid crystal layer of said pair of substrates and said liquid crystal layer is higher than 220° C.

23. A liquid crystal display device according to any one of claims 1 and 2, wherein said alignment layer is made of an organic polymer of dehydration ring closure of polyamic acid composed of diamine compounds expressed by a chemical formula N2N—R—NH2 and tetracarboxilic acid anhydride expressed by a chemical formula, and total number of bonding groups making a molecular axis of polymer rotatable such as —O—, —S—, —CH2—, —C(CH$_3$)$_2$—, —C(CF$_3$)$_2$—, —SO$_2$—, bonding group in the meta position, and bonding group in the ortho position contained in the R position and the X position in the repetitive structure of the organic polymer is equal to and less three.

24. A liquid crystal display device according to any one of claims 1 and 2, wherein at least one of said pair of alignment layer is a photo-reactive material layer.

25. A liquid crystal display device according to claim 24, wherein said alignment layer is formed by irradiating nearly linearly polarized light onto said layer made of the photo-reactive material.

26. A liquid crystal display device according to any one of claims 1 and 2, wherein a pretilt angle of said liquid crystal layer is smaller than 5 degrees.

27. A liquid crystal display device comprising:

a pair of substrates, at least one of said substrates being transparent;

a liquid crystal layer interposed between said pair of substrates;

pixel electrodes and common electrodes and active elements arranged on at least one substrate between said pair of substrates, liquid crystal of said liquid crystal layer being controlled to perform display by applying a voltage between said pixel electrode and said common electrode;

an alignment layer formed on a surface in contact with said liquid crystal layer of each of said pair of substrates; and an insulation film having at least one layer is disposed between said alignment layer in a side of the substrate having said electrodes formed thereon and an electrode which is closer to said alignment layer between said pixel electrode and said common electrode;

wherein a thickness T of said insulation film interposed between said alignment layer in the side of the substrate having said electrodes formed thereon and the electrode which is closer to said alignment layer between said pixel electrode and said common electrode is larger than a value of one fourth of an interval L between said pixel electrode and said common electrode; and wherein the level difference on a surface of said alignment layer in contact with the liquid crystal in the side of the substrate on which said pixel electrodes and said common electrodes are formed is smaller than 50 nm.

* * * * *